United States Patent
Sun et al.

(10) Patent No.: US 10,089,408 B2
(45) Date of Patent: *Oct. 2, 2018

(54) FLEXIBLE GRAPH SYSTEM FOR ACCESSING ORGANIZATION INFORMATION

(71) Applicant: ADP, LLC, Roseland, NJ (US)

(72) Inventors: Michael Sun, Ridgewood, NJ (US); Siobhan Loughman Sabino, Manalapan, NJ (US); Daniel Daehyun Kim, Plainview, NY (US); Jason F. Melo, Hastings-on-Hudson, NY (US)

(73) Assignee: ADP, LLC, Roseland, NJ (US)

( * ) Notice: Subject to any disclaimer, the term of this patent is extended or adjusted under 35 U.S.C. 154(b) by 734 days.

This patent is subject to a terminal disclaimer.

(21) Appl. No.: 14/523,321

(22) Filed: Oct. 24, 2014

(65) Prior Publication Data

US 2016/0110412 A1  Apr. 21, 2016

Related U.S. Application Data

(60) Provisional application No. 62/064,652, filed on Oct. 16, 2014, provisional application No. 62/064,672, filed on Oct. 16, 2014.

(51) Int. Cl.
*G06F 17/30* (2006.01)
*G06Q 10/00* (2012.01)
(Continued)

(52) U.S. Cl.
CPC .... *G06F 17/30905* (2013.01); *G06F 17/3048* (2013.01); *G06F 17/30312* (2013.01);
(Continued)

(58) Field of Classification Search
CPC ......... G06F 17/30312; G06F 17/30368; G06F 17/30595; G06F 17/30958; G06F 17/30905; G06F 17/30575
(Continued)

(56) References Cited

U.S. PATENT DOCUMENTS 6,154,213 A  11/2000  Rennison et al.
9,124,658 B2 *  9/2015  Dave et al.
(Continued)

FOREIGN PATENT DOCUMENTS

WO  0054169 A2  9/2000
WO  2010085523 A1  7/2010

OTHER PUBLICATIONS

N Martinez-Bazan et al., A high-performance graph database management system, May 16, 2011, 124-127.*
(Continued)

*Primary Examiner* — Jean B Fleurantin
(74) *Attorney, Agent, or Firm* — Yee & Associates, P.C.

(57) ABSTRACT

A method and apparatus for accessing a graph database having nodes and relationships describing an organization. An interface in a computer system receives a request from a client to access information about the organization. Further, the interface in the computer system retrieves the information from the graph database having nodes and relationships describing the organization. Still further, the interface in the computer system sends a portion of the information to the client based on how much of the information is displayable by the client.

18 Claims, 20 Drawing Sheets

(51) Int. Cl.
*G06F 21/62* (2013.01)
*G06Q 10/10* (2012.01)

(52) U.S. Cl.
CPC .. *G06F 17/30368* (2013.01); *G06F 17/30554* (2013.01); *G06F 17/30569* (2013.01); *G06F 17/30575* (2013.01); *G06F 17/30595* (2013.01); *G06F 17/30958* (2013.01); *G06F 21/6218* (2013.01); *G06Q 10/00* (2013.01); *G06Q 10/10* (2013.01)

(58) Field of Classification Search
USPC ....................................................... 707/769
See application file for complete search history.

(56) References Cited

U.S. PATENT DOCUMENTS

| | | | |
|---|---|---|---|
| 2005/0246415 A1 | 11/2005 | Belfiore et al. | |
| 2007/0016563 A1 | 1/2007 | Omoigui | |
| 2009/0172558 A1* | 6/2009 | Pickens et al. | 715/741 |
| 2015/0006587 A1* | 1/2015 | Segaran | 707/798 |
| 2015/0026594 A1* | 1/2015 | Dave et al. | 715/753 |
| 2015/0334162 A1* | 11/2015 | Krishnamurthy | 707/740 |
| 2015/0379113 A1* | 12/2015 | Wang et al. | 707/738 |
| 2016/0110473 A1* | 1/2016 | Sabine et al. | 707/769 |
| 2017/0154122 A1 | 6/2017 | Sun et al. | |

OTHER PUBLICATIONS

Rajbhandari et al., Graph Database Model for Querying, Searching and Udating, 2012, IEEE, 170-175.*

Sabino et al., "Graph Loader for a Flexible Graph System," U.S. Appl. No. 14/523,395, filed Oct. 24, 2014, 71 pages.

* cited by examiner

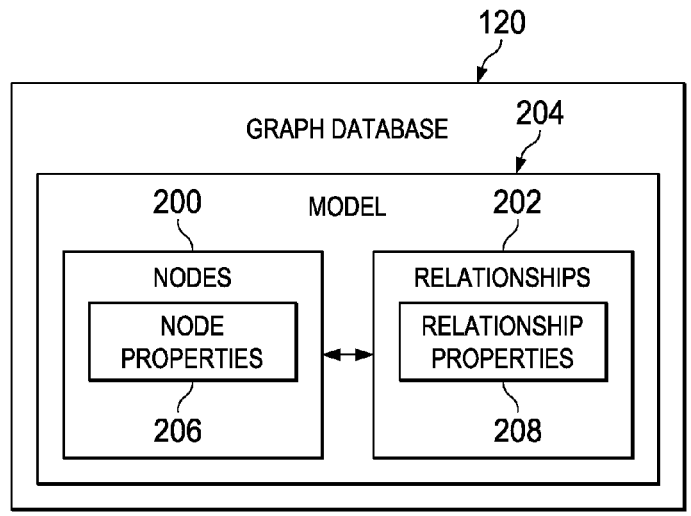
FIG. 2
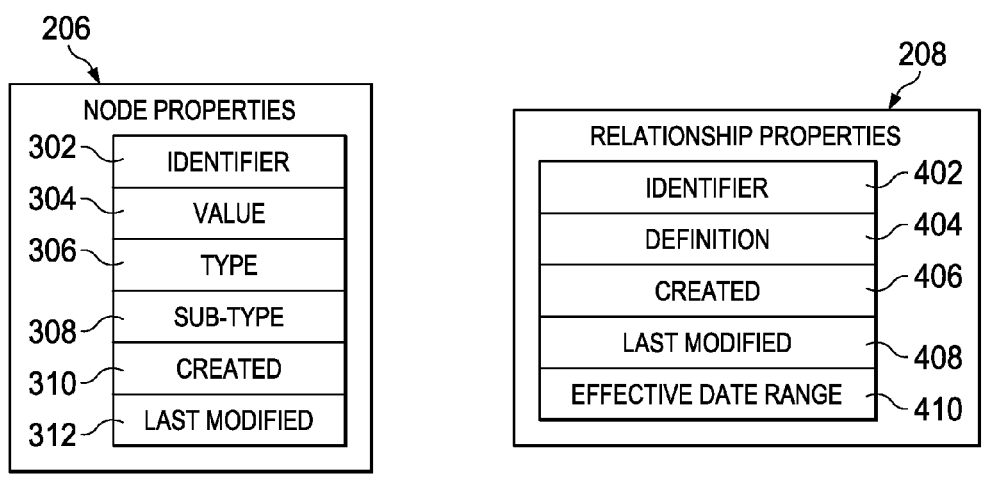
FIG. 3
FIG. 4

1200

PEOPLE

| EID | Name |
|---|---|
| 107 | Mikael Wahner |
| 312 | Krištof Rose |
| 313 | Clara Andrews |
| 123 | Ira Berg |
| 226 | Annunziato Lawrenz |
| 431 | Arlie Grey |
| 329 | Manjula Innocenti |

POSITION

| PID | Title | EID | Manager | DeptId |
|---|---|---|---|---|
| 1529 | Chairman | 107 | NULL | 2 |
| 4457 | CEO | 312 | NULL | 2 |
| 4471 | CTO | 313 | 312 | 5 |
| 1757 | Data science research lead | 123 | 313 | 5 |
| 3229 | Data scientist | 226 | 123 | 5 |
| 6157 | Data scientist | 431 | 123 | 5 |
| 700 | Algorithmist | 329 | 123 | 5 |

DEPARTMENT

| ID | Department |
|---|---|
| 2 | CEO |
| 3 | Operations |
| 4 | Finances |
| 5 | Technology |

FIG. 14

FLEXIBLE GRAPH SYSTEM FOR ACCESSING ORGANIZATION INFORMATION

RELATED PROVISIONAL APPLICATIONS

This application claims the benefit of U.S. Provisional Patent Application Ser. No. 62/064,652, filed Oct. 16, 2014, and entitled "Flexible Graph System for Accessing Organization Information," and U.S. Provisional Patent Application Ser. No. 62/064,672, filed Oct. 16, 2014, and entitled "Graph Loader for a Flexible Graph System," both of which are incorporated herein by reference.

BACKGROUND INFORMATION

1. Field

The present disclosure relates generally to a data processing system and, in particular, to databases. Still more particularly, the present disclosure relates to a method and apparatus for managing an organization database.

2. Background

Information about organizations is often stored in databases. These databases provide a mechanism to use the information to manage an organization. One type of database that is commonly used is a relational database. Relational databases store information about the data and how the data is related to each other. The data and the relationships may be represented in tables.

The database may be used to, for example, generate an organizational chart about the organization. This chart is a diagram that shows the structure of the organization and the relationships and relative ranks between different people or groupings of people in the organization. For example, a node in an organizational chart may represent a person in a department. This type of chart is generated using the data and relationships between the data in the relational database.

A relational database containing information about an organization may also be used to search for employees based on various parameters. Relational databases, however, are often more cumbersome than desired when multiple factors are present in searching these databases. Further, currently used relational databases may be more resource-intensive than desired when searching is performed.

For example, the relational database may be used to identify employees within a selected distance of a location that have skills needed for a particular project. Data related to the parameters is obtained and placed into a table or tables. As the number of parameters increases, the complexity for generating a table or tables also increases. As a result, the time and resources needed to perform a search in a relational database may be greater than desired.

Therefore, it would be desirable to have a method and apparatus that take into account at least some of the issues discussed above, as well as other possible issues. For example, it would be desirable to have a method and apparatus that allows for searching for information about an organization more efficiently than with currently used databases.

SUMMARY

In one illustrative embodiment, a computer system comprises a graph database and an interface. The graph database has nodes and relationships describing an organization. The interface receives a request from a client to access information about the organization. Further, the interface retrieves the information from the graph database. Still further, the interface sends a portion of the information to the client based on how much of the information is displayable by the client.

In another illustrative embodiment, a method for accessing a graph database having nodes and relationships describing an organization is presented. An interface in a computer system receives a request from a client to access information about the organization. Further, the interface in the computer system retrieves the information from the graph database having nodes and relationships describing the organization. Still further, the interface in the computer system sends a portion of the information to the client based on how much of the information is displayable by the client.

In yet another illustrative embodiment, a computer program product for displaying information about an organization on a display system comprises a computer readable storage media, first program code, second program code, and third program code stored on the computer readable storage media. The first program code receives a request from a client to access information about the organization. The second program code retrieves the information from a graph database having nodes and relationships describing the organization. The third program code sends a portion of the information to the client based on how much of the information is displayable by the client.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

FIG. 2 is an illustration of a block diagram of a graph database in accordance with an illustrative embodiment;

FIG. 3 is an illustration of a block diagram of node properties in a graph database in accordance with an illustrative embodiment;

FIG. 4 is an illustration of a block diagram of relationship properties in a graph database in accordance with an illustrative embodiment;

FIG. 12 is an illustration of a table of employees in accordance with an illustrative embodiment;

FIG. 13 is an illustration of a table of positions held by employees in an organization in accordance with an illustrative embodiment;

FIG. 14 is an illustration of a table of departments of an organization in accordance with an illustrative embodiment;

DETAILED DESCRIPTION

The illustrative embodiments recognize and take into account one or more different considerations. For example, the illustrative embodiments recognize and take into account that one manner in which searching for information about an organization may be performed more efficiently is to use a graph database in place of a relational database. The illustrative embodiments also recognize and take into account that improvements may be made to the manner in which graph databases are used.

Those embodiments recognize and take into account that some customers may desire to use existing software for entering information about an organization, but desire to have a more efficient manner to access that information about the organization. In particular, a client may wish to maintain the software used to enter, edit, or both insert and edit information about the organization. Those embodiments recognize and take into account that the situation involves using the current relational database and importing that information to the graph database as often as possible. Those embodiments recognize and take into account that increasing the speed at which information entered into a relational database may be updated in the graph database is desirable such that searches for information in the graph database generate results that are as current as possible.

Thus, the illustrative embodiments provide a method and apparatus for accessing a graph database having nodes and relationships. The process, in one illustrative example, receives a request from a client to access information about an organization. The process retrieves information from the graph database. The process sends a portion of the information to the client based on how much of the information is displayable.

In another illustrative example, information may be added to a graph database. The process receives initial records from a legacy database. These initial records are converted from a source format into nodes and relationships for the graph database. These nodes and relationships are stored in the graph database. Additionally, after receiving initial records, a group of records is received and the process changes at least one of a group of nodes or a group of relationships in the graph database based on the group of records. In this manner, a synchronization of the legacy database and the graph database may occur.

Figure 1:
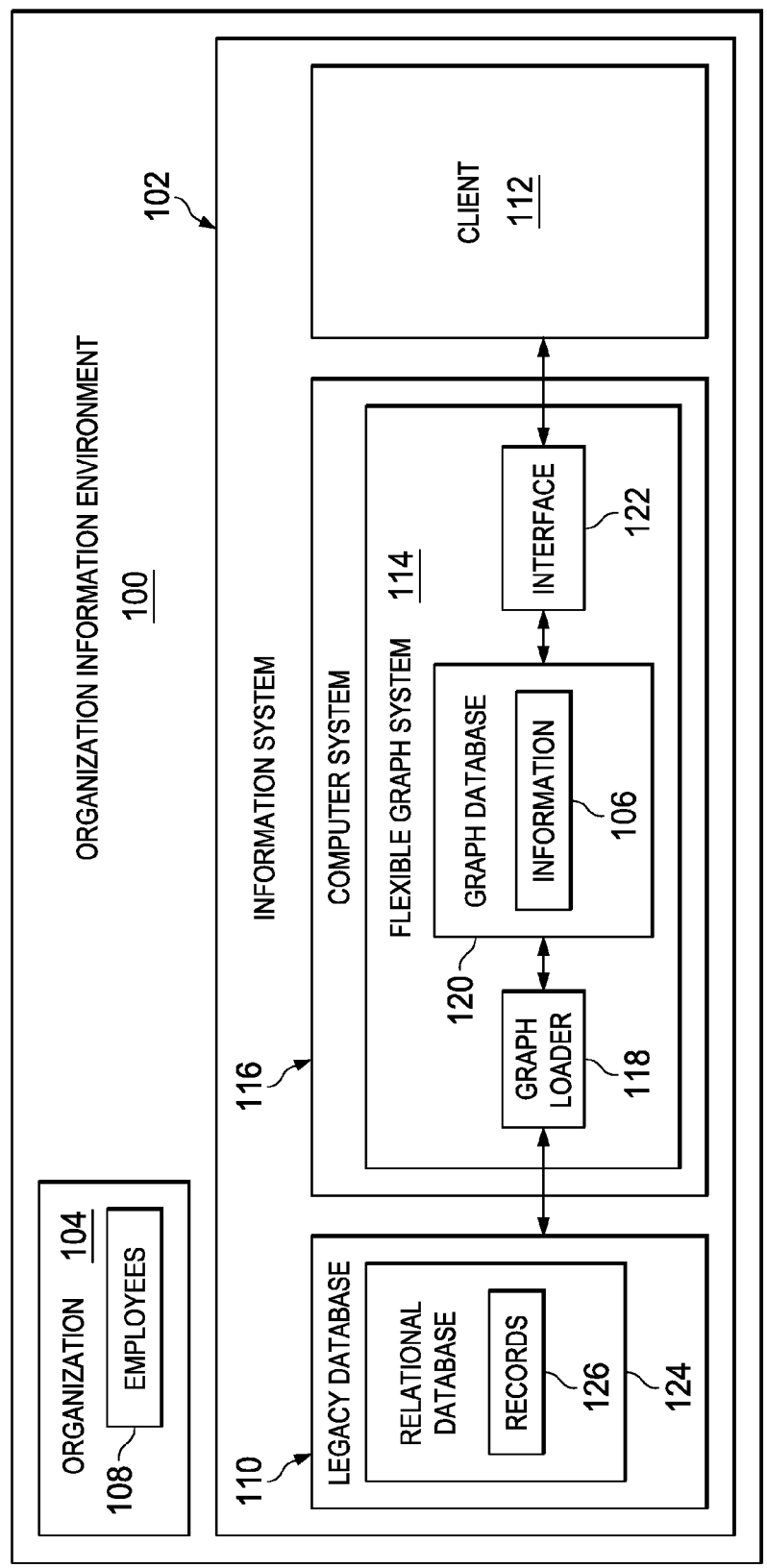
FIG. 1 is an illustration of a block diagram of an organization information environment in accordance with an illustrative embodiment.

With reference now to the figures, and in particular, with reference to FIG. 1, an illustration of a block diagram of an organization information environment is depicted in accordance with an illustrative embodiment. Organization information environment 100 includes information system 102 for organization 104. Organization 104 may take various forms. For example, organization 104 may be a company, a partnership, a government agency, a city, a charitable organization, or some other suitable type of organization. In particular, information system 102 may store information 106 about employees 108 in organization 104.

In this illustrative example, information system 102 includes a number of different components. As depicted, information system 102 includes legacy database 110, client 112, and flexible graph system 114.

Legacy database 110 is a database used by organization 104. In particular, legacy database 110 does not have a desired level of performance in this illustrative example. Legacy database 110 may be, for example, a relational database, an article database, or some other type of database.

Client 112 is a data processing system that may be used to access at least one of legacy database 110 or flexible graph system 114. In particular, client 112 may be used to access information 106 in at least one of legacy database 110 or flexible graph system 114. In these illustrative examples, the access may be at least one of reading, writing, modifying, or otherwise accessing information 106.

As used herein, the phrase "at least one of," when used with a list of items, means different combinations of one or more of the listed items may be used and only one of each item in the list may be needed. In other words, "at least one of" means any combination of items and number of items may be used from the list but not all of the items in the list are required. The item may be a particular object, thing, or a category.

For example, without limitation, "at least one of item A, item B, or item C" may include item A, item A and item B, or item B. This example also may include item A, item B, and item C or item B and item C. Of course, any combinations of these items may be present. In some illustrative examples, "at least one of" may be, for example, without limitation, two of item A; one of item B; and ten of item C; four of item B and seven of item C; or other suitable combinations.

Flexible graph system 114 provides a desired level of performance to access information 106 as compared to legacy database 110. In particular, flexible graph system 114 may be implemented in computer system 116. Computer system 116 is a hardware system that includes one or more data processing systems. When more than one data processing system is present, those data processing systems may be in communication with each other using a communications medium. The communications medium may be a network. The data processing systems may be selected from at least one of a computer, a server computer, a tablet, an electronic flight bag, a mobile phone, or some other suitable data processing system.

In this illustrative example, flexible graph system 114 includes a number of different components. As depicted, flexible graph system 114 includes graph loader 118, graph database 120, and interface 122.

Graph loader 118 receives information 106 for legacy database 110. In this illustrative example, legacy database 110 takes the form of relational database 124. Information 106 is received in a form of records 126 used by relational database 124. Graph loader 118 converts records 126 into a form that is stored in graph database 120.

In the illustrative example, a record in records 126 is a data structure that stores a portion of information 106. In the illustrative example, a record may be a table, an entry with fields, a flat file, or some other suitable format. When legacy database 110 is relational database 124, records 126 may be tables.

Graph database 120 is a database that uses graph structures that have nodes and relationships. These relationships may be edges. Graph database 120 provides index free adjacency. In particular, each element in graph database 120 has a direct pointer to adjacent elements. An index for lookups is unnecessary with graph database 120.

In this illustrative example, graph database 120 is a database based on graph theory. The nodes and relationships stored in graph database 120 are described by a model. These nodes and relationships represent information 106. For example, the nodes in graph database 120 may be nouns in information 106 and the relationships in graph database 120 may be verbs in information 106. In this example, the verbs describe relationships between the nouns in information 106. Traversal between the nodes using the relationships is very efficient in graph databases.

Relational database 124 uses tables with rows as records 126 and columns as properties. These properties may store portions of information 106. The properties may also point a record in records 126 to another record in records 126 using information that identifies the other record. To traverse from one record to another using a property in a column of a record, requires an expensive join operation be performed on relational database 124. Relational databases store data in an efficient manner. However, because of the requirement to perform these join operations, retrieval of information from relational database 124 that is graphical in nature is less efficient as compared to graph database 120.

Interface 122 provides access to graph database 120. In this illustrative example, access may be provided to client 112. In response to requests received from client 112, interface 122 generates queries to obtain results from graph database 120. Interface 122 returns these results to client 112.

In the illustrative example, graph loader 118 and interface 122 may be implemented in software, hardware, firmware or a combination thereof. When software is used, the operations performed by graph loader 118 and interface 122 may be implemented in program code configured to run on hardware, such as a processor unit. When firmware is used, the operations performed by graph loader 118 and interface 122 may be implemented in program code and data and stored in persistent memory to run on a processor unit. When hardware is employed, the hardware may include circuits that operate to perform the operations in graph loader 118 and interface 122.

In the illustrative examples, the hardware may take the form of a circuit system, an integrated circuit, an application-specific integrated circuit (ASIC), a programmable logic device, or some other suitable type of hardware configured to perform a number of operations. With a programmable logic device, the device may be configured to perform the number of operations. The device may be reconfigured at a later time or may be permanently configured to perform the number of operations. Programmable logic devices include, for example, a programmable logic array, a programmable array logic, a field programmable logic array, a field programmable gate array, and other suitable hardware devices. Additionally, the processes may be implemented in organic components integrated with inorganic components and may be comprised entirely of organic components excluding a human being. For example, the processes may be implemented as circuits in organic semiconductors.

In the illustrative example, organization 104 may continue to use legacy database 110. For example, client 112 may be used to make changes to legacy database 110. These changes may be sent to graph loader 118. In turn, graph loader 118 makes changes to graph database 120. As a result, graph database 120 may be synchronized with relational database 124.

In this manner, at least one of the performance or visualization provided using graph database 120 may occur using client 112 to access graph database 120. This type of access may occur while allowing organization 104 to continue using legacy database 110 to make changes to information 106.

For example, employees 108 may continue to use software and other applications designed for legacy database 110 to make changes to information 106. As a result, fewer updates to software and hardware may be made. Further, training and time needed to adjust to new software and hardware for making changes to information 106 directly in graph database 120 may be reduced.

As a result, computer system 116 operates as a special purpose computer system which enables faster access to information 106 about organization 104, as compared to currently used database systems. For example, at least one of interface 122 or graph loader 118 may be used to transport computer system 116 into a special purpose computer. In particular, at least one of graph loader 118 or interface 122 transforms computer system 116 into a special purpose computer system as compared to currently available general computer systems that do not have at least one of graph loader 118 or interface 122.

For example, graph loader 118 may enable the organization of graph database 120 and legacy database 110 in a manner that increases the speed at which information 106 may be accessed by client 112. In particular, interface 122 may allow for synchronization of legacy database 110 and graph database 120 that is substantially in real time. As a result, the manner in which information 106 in legacy database 110 is transformed into a form for use in graph database 120 may occur in a manner that allows for users to view information 106 in graph database 120 that is more accurate than is currently possible when updates to graph database 120 are performed over longer periods of time.

As another example, interface 122 also may decrease the processing resources needed by client 112. As a result, visualization of information 106 may be performed by client 112 that takes various forms that may have different amounts of processing resources. For example, client 112 may be a workstation, a tablet computer, a mobile phone, or some other suitable type of data processing system. With the use of interface 122, processing resources are reduced such that a desired level of performance occurs in data processing systems that have lower levels of processing resources as compared to desktop computers for workstations.

Next, with reference to FIG. 2, an illustration of a block diagram of a graph database is depicted in accordance with an illustrative embodiment. In this illustration, an example of components in graph database 120 is depicted. In the illustrative examples, the same reference numeral may be used in more than one figure. This reuse of a reference numeral in different figures represents the same element in the different figures.

Graph database 120 includes nodes 200 and relationships 202. Nodes 200 and relationships 202 form model 204 for organization 104 in FIG. 1. Nodes 200 may represent various entities. For example, nodes 200 may represent at least one of a person, a position, and organization 104.

As depicted, relationships 202 indicate connections between nodes 200. In particular, relationships 202 indicate the relationship between nodes 200.

In this illustrative example, nodes 200 have node properties 206. Additionally, relationships 202 have relationship properties 208.

As depicted, node properties 206 for nodes 200 are portions of information 106 in FIG. 1 for the various entities. As used herein, a property for an item is at least one of an attribute, a value, a reference, or other suitable types of properties for the item. For example, a property for a node may be at least one of an attribute of the node, a value for the node, or a reference pointing to the node.

In the illustrated example, relationship properties 208 for relationships 202 define relationships 202 between nodes 200 in model 204 for organization 104 in FIG. 1. For example, a property for a relationship may be at least one of an attribute of the relationship, a definition of the relationship, or a reference pointing to the relationship.

Turning next to FIG. 3, an illustration of a block diagram of node properties in a graph database is depicted in accordance with an illustrative embodiment. In this illustrative example, an example of node properties 206 is shown. As depicted, node properties 206 are an example of properties that may be used for nodes 200 in FIG. 2 in model 204 of organization 104 in FIG. 1.

In this illustrative example, node properties 206 include identifier 302, value 304, type 306, sub-type 308, created 310, and last modified 312. In the illustrated example, identifier 302 in node properties 206 for a node in nodes 200 in FIG. 2 is a reference pointing to the node. For example, the node may be found in a graph database using identifier 302.

As depicted, value 304 is the content of a node. Value 304 is at least one of a name, a number, data, or any other suitable type of value for the content of the node. For example, value 304 may be the name of a person represented by the node. As another example, value 304 may be employment data about an employee in employees 108 in organization 104 in FIG. 1.

In the illustrated example, type 306 is an identifier that describes what value 304 represents. Type 306 is at least one of identity, person, position, or organization. Type 306 may have sub-types.

As depicted, sub-type 308 is an identifier that describes what value 304 represents within type 306. For example, sub-type 308 for the organization type may be at least one of company, division, department, group, or other suitable sub-type for the organization type. As another example, sub-type 308 for the identify type is at least one of employee identifier, department identifier, client identifier, or other suitable sub-type of the identity type.

In this illustrative example, created 310 is a date and time that node properties 206 were created. Last modified 312 is a date and time that node properties 206 were last changed, in this illustrative example.

Next in FIG. 4, an illustration of a block diagram of relationship properties in a graph database is depicted in accordance with an illustrative embodiment. In this illustrative example, an example of relationship properties 208 is shown. As depicted, relationship properties 208 are examples of properties that may be used in relationships 202 in FIG. 2 in model 204 of organization 104 in FIG. 1.

In this illustrative example, relationship properties 208 include identifier 402, definition 404, created 406, last modified 408, and effective date range 410. In the illustrative example, identifier 402 in relationship properties 208 for a relationship is a reference to the relationship. For example, the relationship may be found in a graph database using identifier 402.

As depicted, definition 404 is a specification of a relationship for a node. In this illustrative example, definition 404 for the relationship of the node is at least one of a relationship between the node and at least one of the node, or another node. In this illustrative example, definition 404 of relationships is at least one of identifies, occupied by, belongs to, part of, manages, in charge of, or other suitable types of relationships for entities of organizations.

For example, definition 404 may be a specification of an occupied relationship between a node representing a position in model 204 in FIG. 2 and a node representing a person in model 204. In other words, in this example, definition 404 specifies that the position is occupied by the person.

As another example, definition 404 may specify a manages or in charge of relationship between a node representing a first position in model 204 in FIG. 2 and a node representing a second position in model 204. In other words, in this example, definition 404 specifies that the first position manages or is in charge of the second position.

In this illustrative example, created 406 is a date and time that relationship properties 208 were created. Last modified 408 is a date and time that relationship properties 208 were last changed, in this illustrative example.

Effective date range 410 identifies when the relationship is in effect. In this illustrative example, effective date range 410 includes at least one of a group of start dates indicating when the relationship is in effect, a group of end dates identifying when the relationship is not in effect, or other suitable types of information for identifying times when a relationship is or is not in effect. As used herein, "a group of" when used with reference to items, means one or more items. For example, a group of dates is one or more dates.

Figure 5:
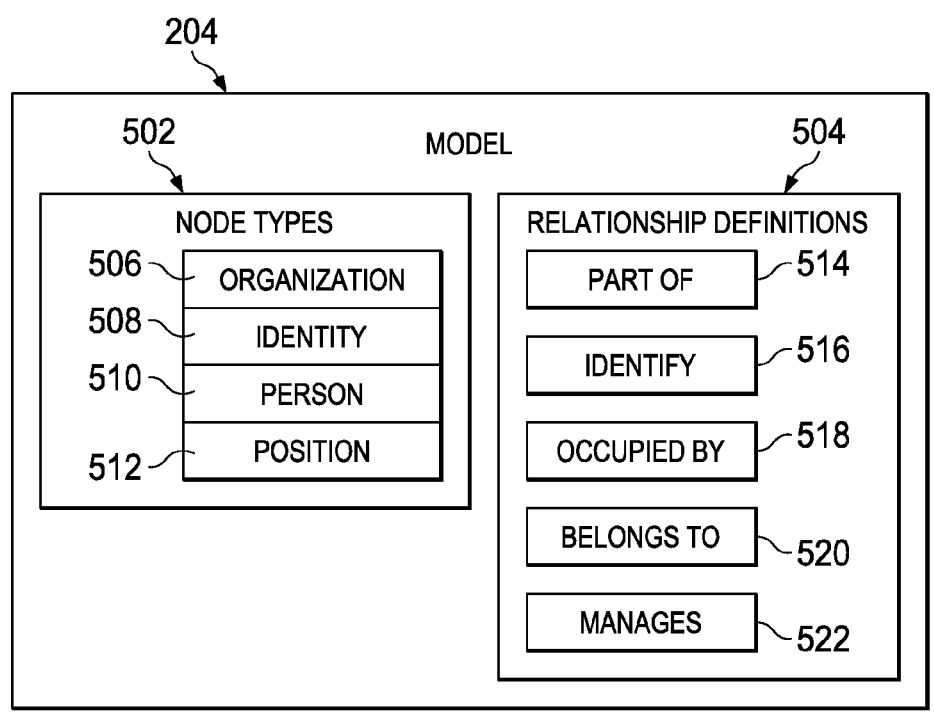
FIG. 5 is an illustration of a block diagram of a model for an organizational graph database in accordance with an illustrative embodiment.

Turning next to FIG. 5, an illustration of a block diagram of a model for an organizational graph database is depicted in accordance with an illustrative embodiment. In this illustrative example, an example of components that may be used in model 204 is shown.

As depicted, node types 502 are an example of types of nodes 200 in FIG. 2. As also depicted, relationship definitions 504 are examples of definitions of relationships 202 in FIG. 2 for nodes 200 for model 204 of organization 104 in FIG. 1.

In this illustrative example, node types 502 include organization 506, identity 508, person 510, and position 512. In this illustrative example, organization 506 is at least one of a parent company, a group of two or more companies, a group of two or more divisions within a company, a company, a division of a company, a department in a company, a group of people, or other suitable portions of organization 104 in FIG. 1.

As depicted, person 510 is at least one of an employee in employees 108 in FIG. 1, a contractor, a temporary hire, a customer of organization, a relative of an employee, a lawyer retained by organization 104 in FIG. 1, or other suitable types of persons that may be added to model 204 for organization 104. In this illustrative example, position 512 is at least one of a job or task performed by a person. For example, position 512 may be a task for managing an employee. As another example, position 512 may be a task for leading an employee in performing another task. In this illustrative example, identity 508 is at least one of an employee identifier, a department identifier, a client identifier, or other suitable type of identifier within an organization.

In this illustrative example, relationship definitions 504 include part of 514, identify 516, occupied by 518, belongs to 520, and manages 522. As depicted, part of 514 specifies that a node is a part of another node. In particular, part of 514 is a type of relationship definition that specifies a node in nodes 200 in FIG. 2 is a part of another node in nodes 200.

As depicted, identify 516 specifies that one node identifies another node. In particular, identify 516 is a type of relationship definition that specifies a node in nodes 200 in FIG. 2 identifies another node in nodes 200. For example, an identity node may identify an organization.

In the illustrative example, occupied by 518 specifies that one node is occupied by another node. In particular, occupied by 518 is a type of relationship definition that specifies a node in nodes 200 in FIG. 2 is occupied by another node in nodes 200. For example, a manager position may be occupied by an employee.

In this illustrated example, belongs to 520 specifies that one node belongs to another node. In particular, belongs to 520 is a type of relationship definition that specifies a node in nodes 200 in FIG. 2 belongs to another node in nodes 200. For example, a position may belong to an organization.

As depicted, manages 522 specifies that one node manages another node. In particular, manages 522 is a type of relationship definition that specifies a node in nodes 200 in FIG. 2 manages another node in nodes 200. For example, at least one of a person or position may manage at least one of an organization, a person, or a position.

Figure 6:
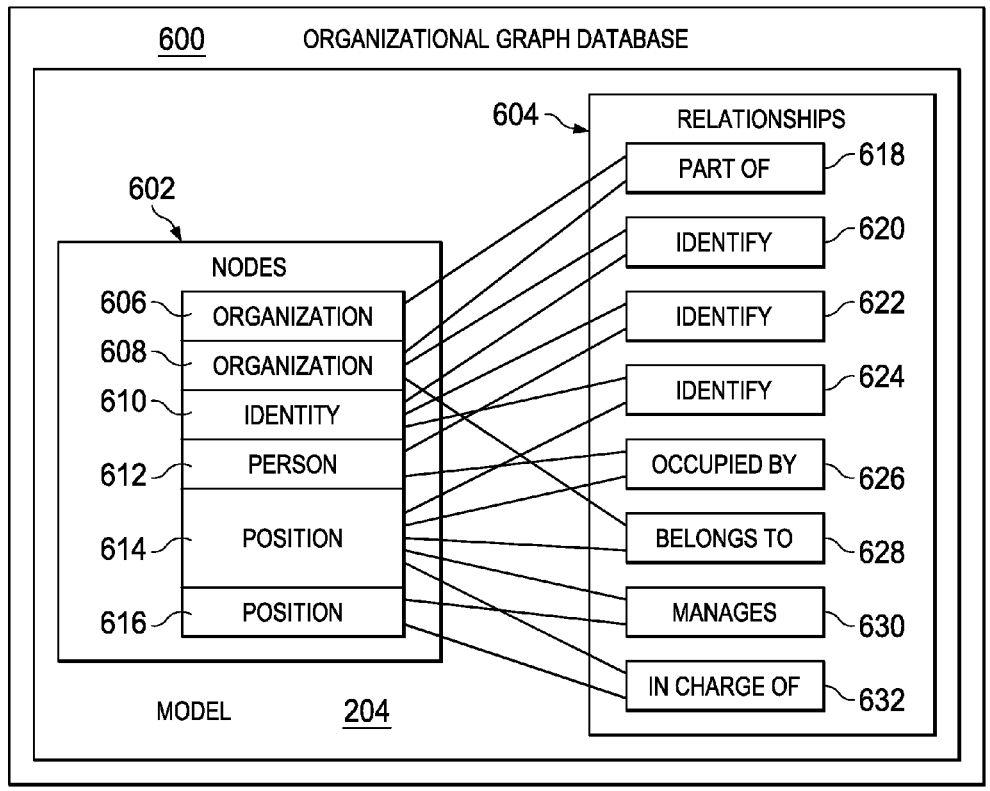
FIG. 6 is an illustration of a block diagram of a model for an organizational graph database in accordance with an illustrative embodiment.

With reference next to FIG. 6, an illustration of a block diagram of a model for an organizational graph database is depicted in accordance with an illustrative embodiment. In this illustrative example, one manner in which model 204 in FIG. 2 may be implemented is shown in FIG. 6.

As depicted, organizational graph database 600 is an example of an implementation for graph database 120 shown in FIGS. 1 and 3. In this illustrative example, organizational graph database 600 shows an example of nodes 602 and relationships 604 in organizational graph database 600. As depicted, nodes 602 and relationships 604 form an example of nodes 200 and relationships 202 for model 204 in FIG. 2.

In the illustrative example, nodes 602 include organization 606, organization 608, identity 610, person 612, position 614, and position 616. In this illustrative example, organization 606 is organization 104 in FIG. 1. Organization 608 is at least one of a company in organization 606, a division in organization 606, a department in organization 606, a group in organization 606, or other suitable portion of an organization.

As depicted, person 612 is an employee in employees 108 in FIG. 1. In this illustrative example, position 614 in organization 608 is occupied by person 612. As depicted, position 616 at least one of manages position 614 or is in charge of position 614. In this illustrative example, identity 610 is at least one of an employee identifier, a department identifier, a client identifier, or other suitable type of identifier within an organization.

In this illustrative example, relationships 604 include part of 618, identify 620, identify 622, identify 624, occupied by 626, belongs to 628, manages 630, and in charge of 632. As depicted, part of 618 specifies that organization 606 is part of organization 608. In this illustrative example, identify 620 specifies that identity 610 identifies organization 608. Identify 622 specifies that identity 610 identifies person 612. Identify 624 specifies that identity 610 identifies position 614.

As depicted, occupied by 626 specifies that person 612 occupies position 614. As also depicted, belongs to 628 specifies that position 614 belongs to organization 608.

In this illustrative example, manages 630 specifies that position 616 manages position 614. In charge of 632 specifies that position 616 is in charge of position 614.

Figure 7:
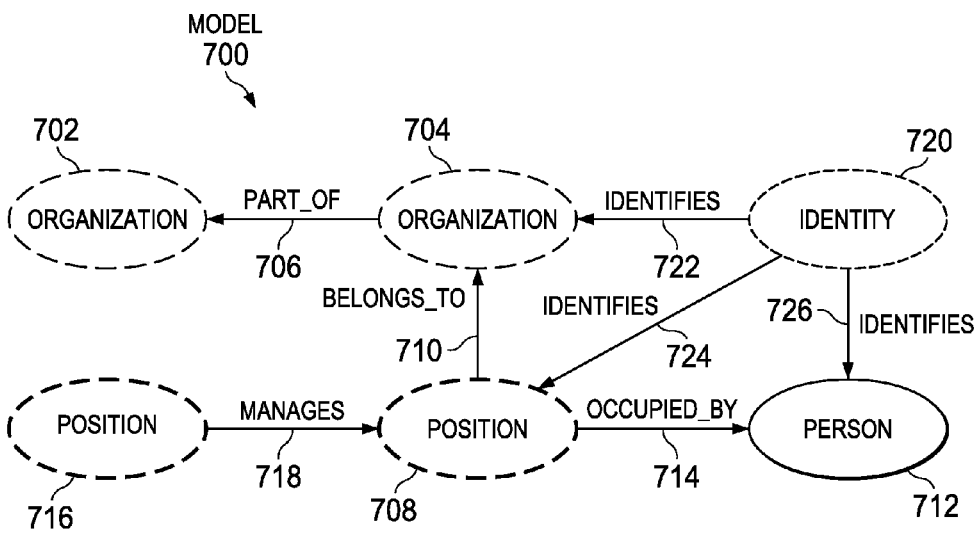
FIG. 7 is an illustration of a model for an organizational graph database in accordance with an illustrative embodiment.

With reference now to FIG. 7, an illustration of a model for an organizational graph database is depicted in accordance with an illustrative embodiment. As depicted, model 700 is an example of one manner in which model 204, shown in block form in FIG. 5 and FIG. 6, may be implemented.

In this illustrative example, model 700 includes organization 702, organization 704, part of 706, position 708, belongs to 710, person 712, occupied by 714, position 716, manages 718, identity 720, identifies 722, identifies 724, and identifies 726. As depicted, part of 706 shows that organization 704 is part of organization 702. Belongs to 710 shows that position 708 belongs to organization 704. Occupied by 714 shows that position 708 is occupied by person 712. Manages 718 shows that position 716 manages position 708.

In this illustrative example, identifies 722 shows that identity 720 identifies organization 704. As depicted, identifies 724 shows that identity 720 identifies position 708. As also depicted, identifies 726 shows that identity 720 identifies person 712.

Figure 8:
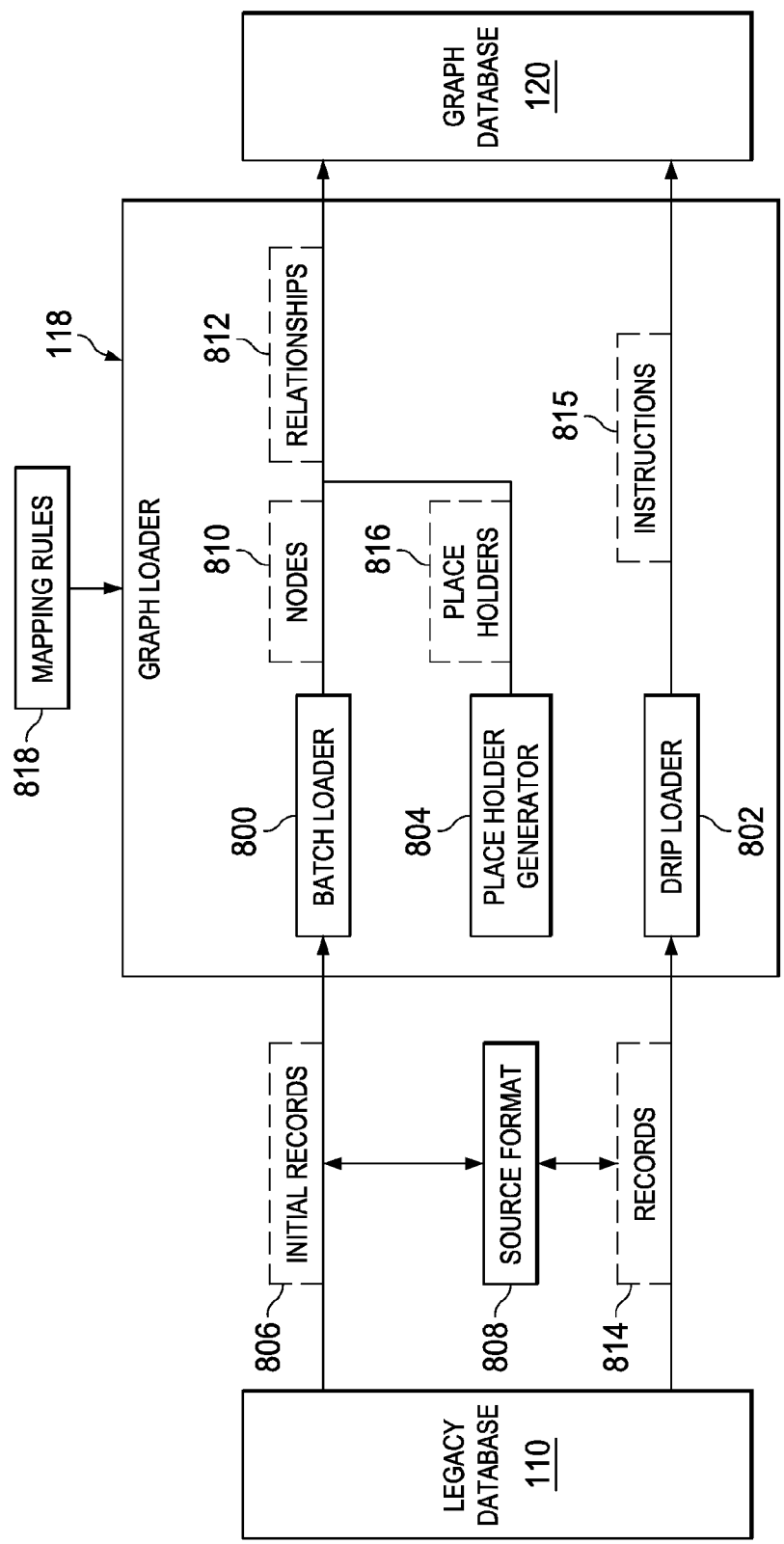
FIG. 8 is an illustration of a block diagram of a graph loader in accordance with an illustrative embodiment.

With reference next to FIG. 8, an illustration of a block diagram of a graph loader is depicted in accordance with an illustrative embodiment. In this figure, examples of components for graph loader 118 in FIG. 1 are depicted. In this illustrative example, graph loader 118 includes batch loader 800, drip loader 802, and place holder generator 804. In the illustrative examples, the same reference numeral may be used in more than one figure. This reuse of a reference numeral in different figures represents the same element in the different figures.

As depicted, batch loader 800 receives initial records 806 from legacy database 110. Batch loader 800 converts initial records 806 in source format 808 for legacy database 110 into nodes 810 and relationships 812 for graph database 120 and stores nodes 810 and relationships 812 in graph database 120.

In this illustrative example, drip loader 802 receives a group of records 814 after initial records 806 have been converted into nodes 810 and relationships 812 for graph database 120. In this illustrative example, records 814 also have source format 808.

Drip loader 802 changes at least one of a group of nodes or a group of relationships in graph database 120 based on the group of records 814. As a result, synchronization between legacy database 110 and graph database 120 occurs. In this illustrative example, drip loader 802 generates instructions 815. Instructions 815 describe what changes should be made in graph database 120. As depicted, drip loader 802 sends instructions 815 to graph database 120.

As depicted, place holder generator 804 determines whether sufficient information is present in initial records 814 from relational database 124 in FIG. 1 for storing nodes 810 and relationships 812 in graph database 120. Additionally, place holder generator 804 identifies a portion of nodes 810 or a portion of relationships 812 for which insufficient information is present in records 814 from legacy database 110 when sufficient information is not present in records 814 from legacy database 110.

Further, place holder generator 804 adds a group of place holders 816 in graph database 120 for at least one of the portion of the nodes 810 or the portion of the relationships 812 for which information needed for nodes 810 or relationships 812 is absent. As used herein, a place holder is at least one of a node that indicates more information is needed for the node or a relationship that indicates more information is needed for the relationship.

In this illustrative example, drip loader 802 replaces the group of place holders 816 when information 106 in FIG. 1 is present in the group of records 814 for replacing the group of place holders 816. As depicted, the replacement of the group of place holders 816 may occur at the same time or at different times depending on when information is received in records 814 to replace the group of place holders 816.

As depicted, mapping rules 818 specify how to convert initial records 806 and records 814 from source format 808 into at least one of nodes 810, relationships 812, instructions 815, or place holders 816. In this illustrative example, batch loader 800 may use mapping rules 818 on records 814 to convert records 814 into nodes 810 and relationships 812. Additionally, drip loader 802 may use mapping rules 818 on the group of records 814 to generate instructions 815 for changing at least one of a group of nodes 810 or group of relationships 812 in graph database 120.

Figure 9:
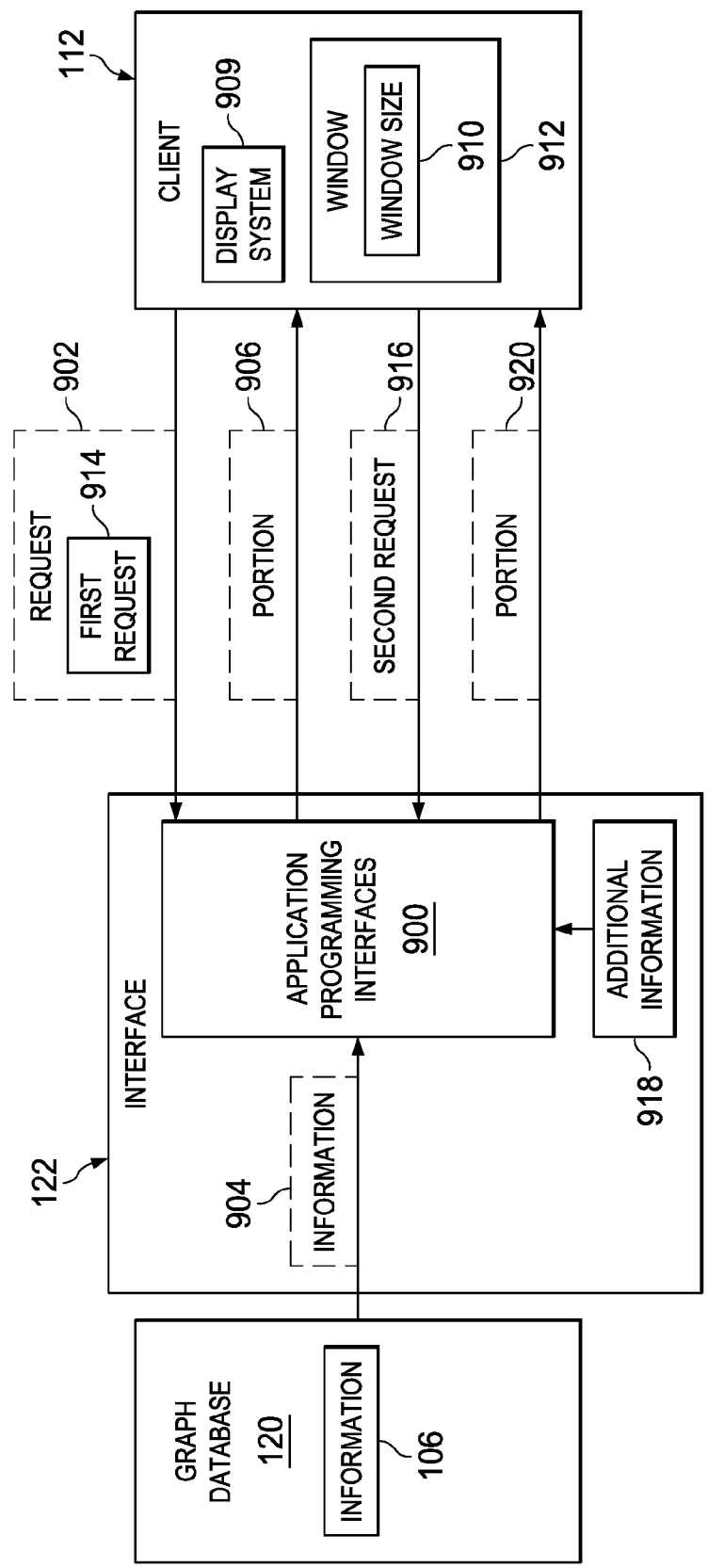
FIG. 9 is an illustration of a block diagram of an interface in accordance with an illustrative embodiment.

Turning now to FIG. 9, an illustration of a block diagram of an interface is depicted in accordance with an illustrative embodiment. In this illustrative example, interface 122 may be implemented using application programming interfaces 900.

As depicted, application programming interfaces 900 in interface 122 receives request 902 from client 112. Request 902 is a request to access information 904 about organization 104 in FIG. 1. Information 904 may be a subset or all of the information 106 stored in graph database 120.

In this illustrative example, interface 122 receives information 904 from graph database 120. Interface 122 sends portion 906 of information 904 to client 112 based on how much of information 904 is displayable by client 112. In this illustrative example, portion 906 may be some or all of information 904. Additionally, interface 122 may cache information 904. Caching information 904 means that information 904 is stored in a location by interface 122. This location is selected as one that allows for faster use of information 904 as compared to retrieving information 904 from graph database 120.

In the illustrative example, the amount of information displayable by client 112 may be based on at least one of display system 908, window size 910, or other suitable factors. For example, display system 908 may include one or more display devices. The display device in display system 908 on which information 904 is to be displayed may have a size and resolution that only allows for portion 906 of information 904 to be displayed.

In another example, window size 910 is for window 912. Window 912 is a graphical container in which information 904 is to be displayed. In the illustrative example, portion 906 of information 904 may be displayed in window 912 having window size 910. As a result, when window size 910 changes, portion 906 also may change for client 112.

The amount of information that may be displayed by client 112 may be identified in a number of different ways. For example, a profile or other information about client 112 may be present that identifies the capability of display system 908 to display information 904. In another example, client 112 may send an indication of how much of information 904 may be displayed. For example, client 112 may send information about at least one of display system 908 or window size 910.

In this illustrative example, request 902 is first request 914. Interface 122 receives second request 916 from client 112 for additional information 918. For example, information 904 may be a number of nodes and relationships that are graphically displayed in display system 908 of client 112. User input may be received to display nodes and relationships on one side of the nodes and relationships displayed. This user input for the additional nodes and relationships may form second request 916.

As depicted, interface 122 sends additional information 918 from information 904 retrieved and cached from first request 914 from client 112 when the additional information is located in information 904. As depicted, interface 122 retrieves additional information 918 from graph database 120 when additional information 918 is absent from information 904 that was retrieved and cached. Interface 122 sends portion 920 of additional information 918 to client 112 based on how much of additional information 918 is displayable by client 112.

In this manner, the display of information may be performed more quickly and efficiently as compared to currently used techniques. In the illustrative example, interface 122 retrieves information 904. In this particular example, only the part of information 904 that can be displayed by client 112 is sent to client 112. As a result, resources and client 112 are not needed to store and process portions of information 904 that are displayed on display system 908. When additional information 918 is requested, interface 122 may send additional information 918 from information 904 cached by interface 122. Additionally, less access to graph database 120 may occur when using interface 122 in the illustrative example.

Figure 10:
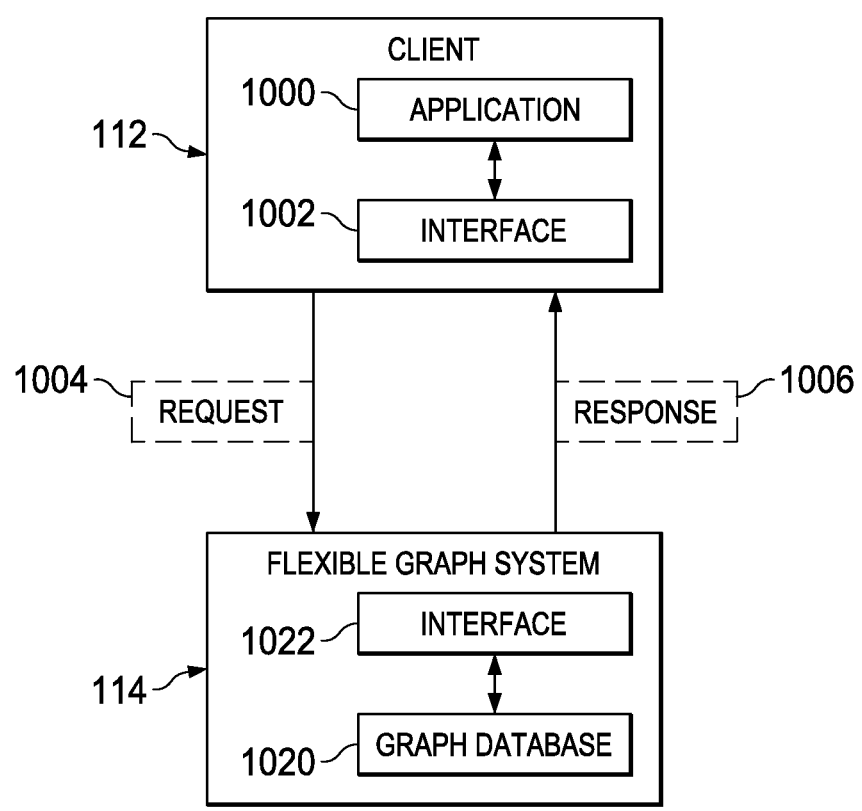
FIG. 10 is an illustration of a block diagram of a client requesting information from a flexible graph system in accordance with an illustrative embodiment.

Turning next to FIG. 10, an illustration of a block diagram of a client requesting information from a flexible graph system is depicted in accordance with an illustrative embodiment. In this figure, examples of components for client 112 are depicted.

In this illustrative example, client 112 includes application 1000, and interface 1002. As depicted, application 1000 uses interface 1002 to generate request 1004. Request 1004 is a request to access information stored in graph database 120. As depicted, client 112 sends request 1004 to flexible graph system 114. For example, request 1004 may be a restful request to get at least one of a group of nodes, a group of node properties, a group of relationships, or a group of relationship properties stored in graph database 120.

As depicted, flexible graph system 114 receives request 1004 from client 112. In this illustrative example, interface 122 retrieves the information requested from graph database 120. Interface 122 generates response 1006. Flexible graph system 114 sends response 1006 to client 112 based on request 1004. For example, response 1006 may include at least one of a group of nodes, a group of node properties, a group of relationships, or a group of relationship properties stored in graph database 120. In this example, response 1006 may be in javascript object notation (JSON) format, extensible markup language (XML) format, or some other suitable format for replies to restful requests.

In this illustrative example, at least one of interface 122 or graph database 120 may identify whether client 112 has permission to receive a response for all or a portion of the information requested. For example, when client 112 does not have permission for all of the information requested, the portion in response 1006 may be the portion for which the client has permission.

In this illustrative example, the permissions for clients may be in a table of permissions. This table of permissions includes at least one of particular departments, particular positions, particular employees, particular relationships, or other suitable types of nodes or relationships for which permissions may be given for certain clients.

Figure 11:
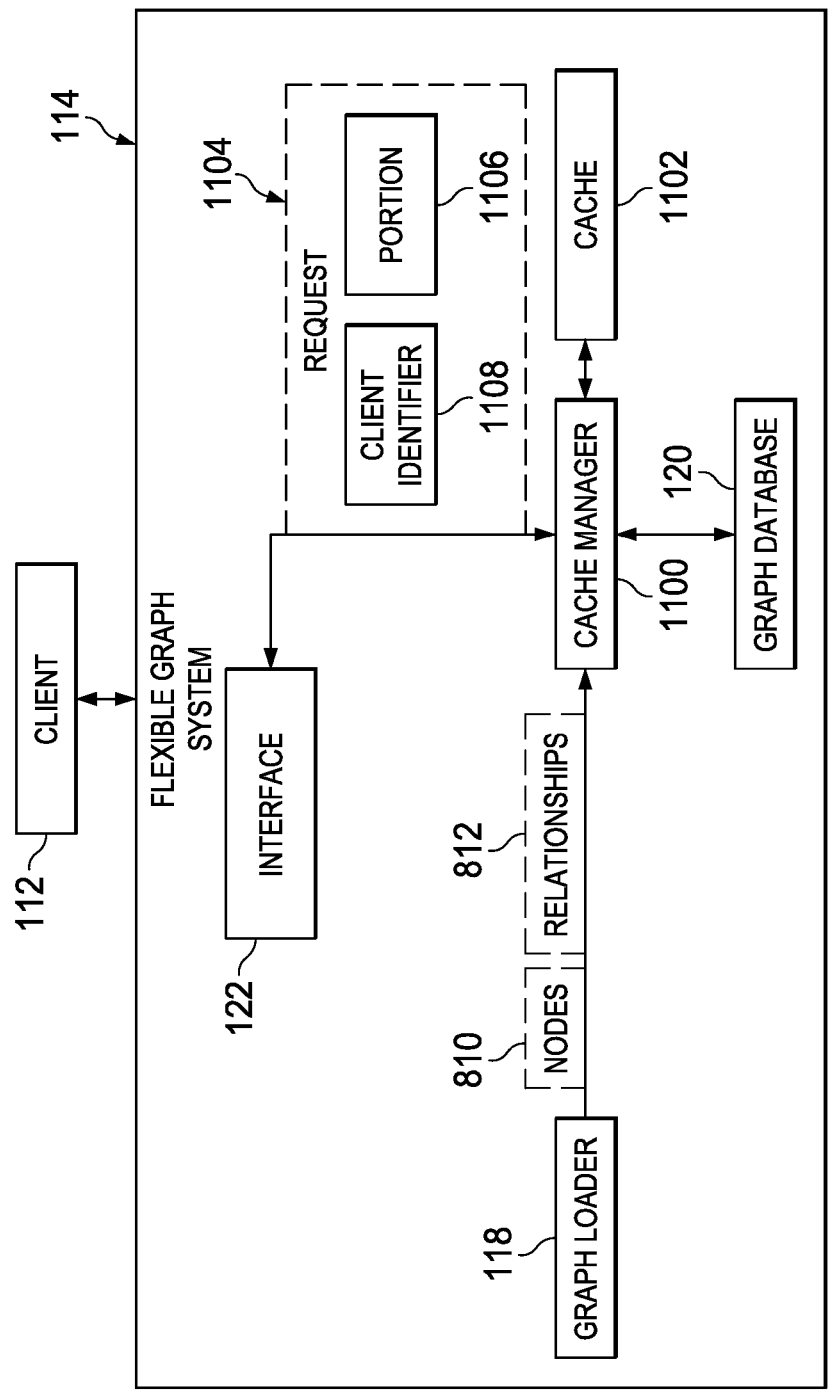
FIG. 11 is an illustration of a block diagram of a flexible graph system in accordance with an illustrative embodiment.

With reference to FIG. 11, an illustration of a block diagram of a flexible graph system is depicted in accordance with an illustrative embodiment. In this figure, examples of components for flexible graph system 114 are depicted.

In this illustrative example, flexible graph system 114 includes cache manager 1100, cache 1102, graph loader 118, interface 122, and graph database 120. As depicted, cache manager 1100 receives at least one of nodes 810 or relationships 812 from graph loader 118. Cache manager 1100 stores at least one of nodes 810 or relationships 812 in graph database 120 and cache 1102. Cache manager 1100 also retrieves at least one of nodes 810 or relationships 812 from graph database 120 and cache 1102.

As depicted, cache 1102 is a location where at least one of nodes 810 or relationships 812 are stored for later retrieval. Retrieving information from cache 1102 is substantially faster than retrieving the information from graph database 120.

In this illustrative example, cache manager 1100 receives request 1104 for portion 1106 of at least one of nodes 810 or relationships 812. Cache manager 1100 retrieves portion 1106 from at least one of cache 1102 or graph database 120. For example, cache manager 1100 may retrieve all or a portion of portion 1106 from cache 1102. In this example, cache manager 1100 may receive the portion of portion 1106 that is not in cache 1102 from graph database 120.

As depicted, request 1104 may include client identifier 1108. In this illustrative example, client identifier 1108 may be a key for client 112, a user name for client 112, a name of an application in client 112 making the request for portion 1106, or other suitable types of client identifiers.

In this illustrative example, cache manager 1100 may use client identifier 1108 to manage at least one of nodes 810 or relationships 812 in cache 1102. For example, when cache manager 1100 receives client identifier 1108, cache manager 1100 may retrieve a portion of graph database 120 and store the portion in cache 1102. In this depicted example, cache manager 1100 uses the receipt of client identifier 1108 in request 1004 as a notification that client 112 has accessed interface 122. In this manner, cache manager 1100 receives a notification that client 112 has accessed interface 122. In this example, the portion retrieved by cache manager 1100 may be based on prior requests for information received from client 112.

As depicted, cache manager 1100 may identify the portion in a profile for client 112 or all clients that indicates client 112 is likely to request the portion. For example, each time client 112 makes a request for a portion of information in graph database 120, cache manager 1100 may store the portion of a profile for client 112 or all clients.

The illustration of organization information environment 100 and different components in this environment in FIG. 1 is not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, information system 102 may be used for one or more organizations in addition to or in place of organization 104. As another example, place holder generator 804 may be implemented as part of batch loader 800 in FIG. 8. In still another illustrative example, instructions 815 generated by drip loader 802 also may be generated by place holder generator 804 in FIG. 8.

Turning next to FIG. 12, an illustration of a table of employees is depicted in accordance with an illustrative embodiment. The rows in table 1200 are examples of records of employees.

As depicted, the rows in table 1200 are examples of records 126 in FIG. 1. In particular, the rows in table 1200 are examples of employees 108 in organization 104 in FIG. 1.

In this illustrative example, the columns in table 1200 include an employee identifier and a name for the employee. Employee identifiers identify individual employees in an organization. Employee identifiers may be selected from at least one of social security numbers, sequential numbers assigned when the employees are hired, or any other suitable types of identifiers that uniquely identify employees. The employee names are used within the organization to personally identify the employee.

Turning now to FIG. 13, an illustration of a table of positions held by employees in an organization is depicted in accordance with an illustrative embodiment. In this illustrative example, the rows in table 1300 are examples of records for positions held by employees.

As depicted, the rows in table 1300 are examples of records 126 for positions in organization 104 in FIG. 1. As also depicted, the rows in table 1300 are examples of positions held by employees 108 in organization 104 in FIG. 1.

In this illustrative example, the columns in table 1300 include a position identifier, a title, an employee identifier, a manager identifier, and a department identifier. Position identifiers are unique identifiers for positions held by individual employees of an organization. The title is a description of the position held. The employee identifier in table 1300 is the employee number assigned to the position. The employee identifier is used to look up the record for the employee in table 1200 in FIG. 12. The manager is an employee identifier for the manager of the employee assigned to the position. The manager identifier, being an employee identifier, may also be used to look up the record for the manager in table 1200 in FIG. 12. The department identifier is a unique identifier for departments of an organization.

Turning next to FIG. 14, an illustration of a table of departments of an organization is depicted in accordance with an illustrative embodiment. In this illustrative example, the rows in table 1400 are examples of records of departments for an organization.

As depicted, rows in table 1400 are examples of records 126 in FIG. 1. As also depicted, the rows in table 1400 are examples of departments of organization 104 in FIG. 1.

In this illustrative example, departments in organization 104 have positions that are held by employees 108 in organization 104. In this illustrative example, the columns in table 1400 include a department identifier and the name of the department. The department identifier is a unique identifier for departments of an organization that can be used to look up positions assigned to the department in table 1300 in FIG. 13.

Figure 15:
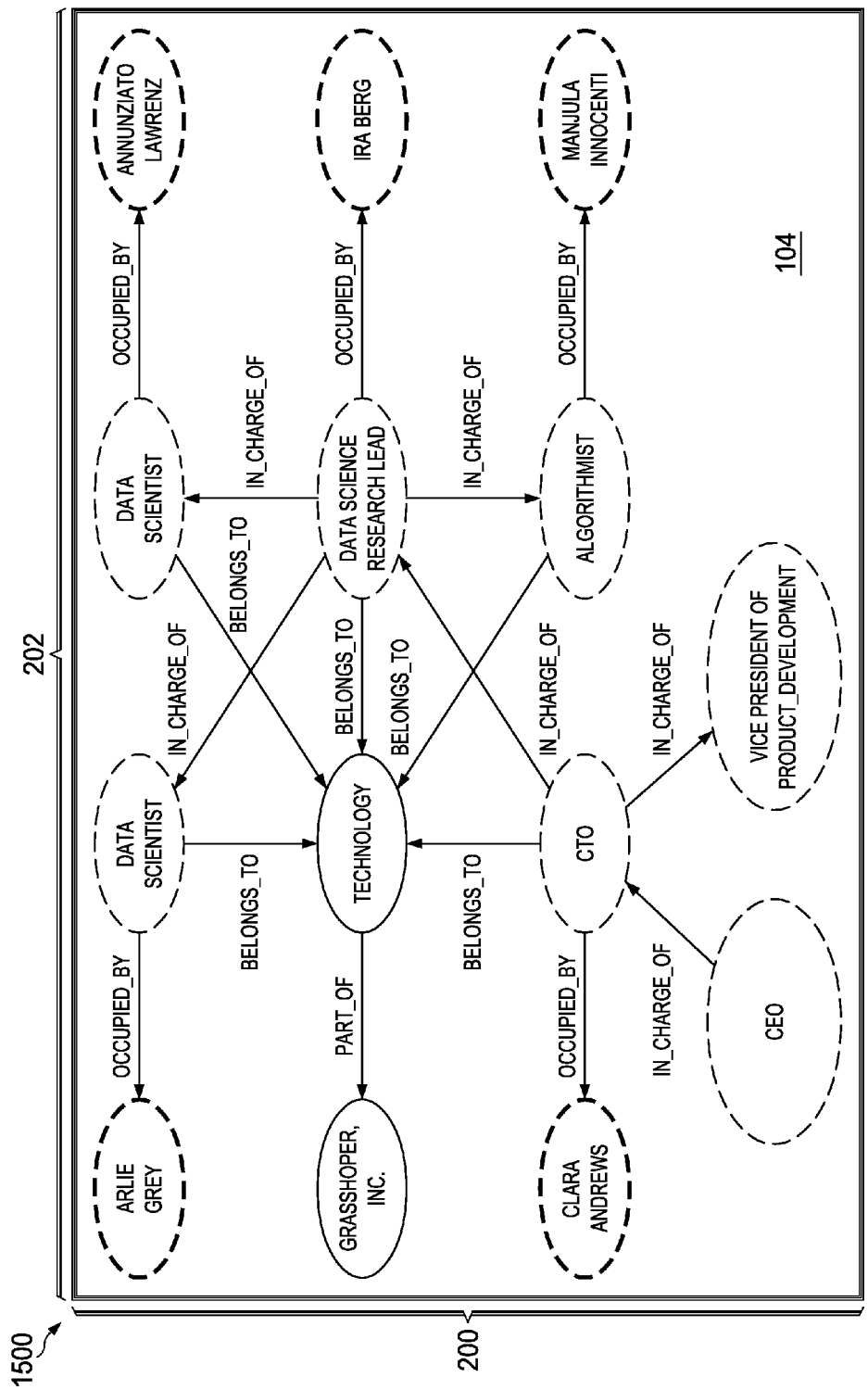
FIG. 15 is an illustration of a model for an organization in accordance with an illustrative embodiment.

With reference to FIG. 15, an illustration of a model for an organization is depicted in accordance with an illustrative embodiment. In this illustration, model 1500 shows an example of nodes 200 and relationships 202 in FIG. 2 for organization 104 that may be displayed on client 112 in FIG. 1. In particular, model 1500 is an example of information 904 and additional information 918 that may be sent to client 112 for display on display system 908 in FIG. 9.

In this illustrative example, model 1500 shows a node in nodes 200 for an organization named Grasshopper Incorporated. As depicted, a node in nodes 200 for a division named technology has a relationship in relationships 202 specifying that the technology division is a part of Grasshopper Incorporated.

Figure 16:
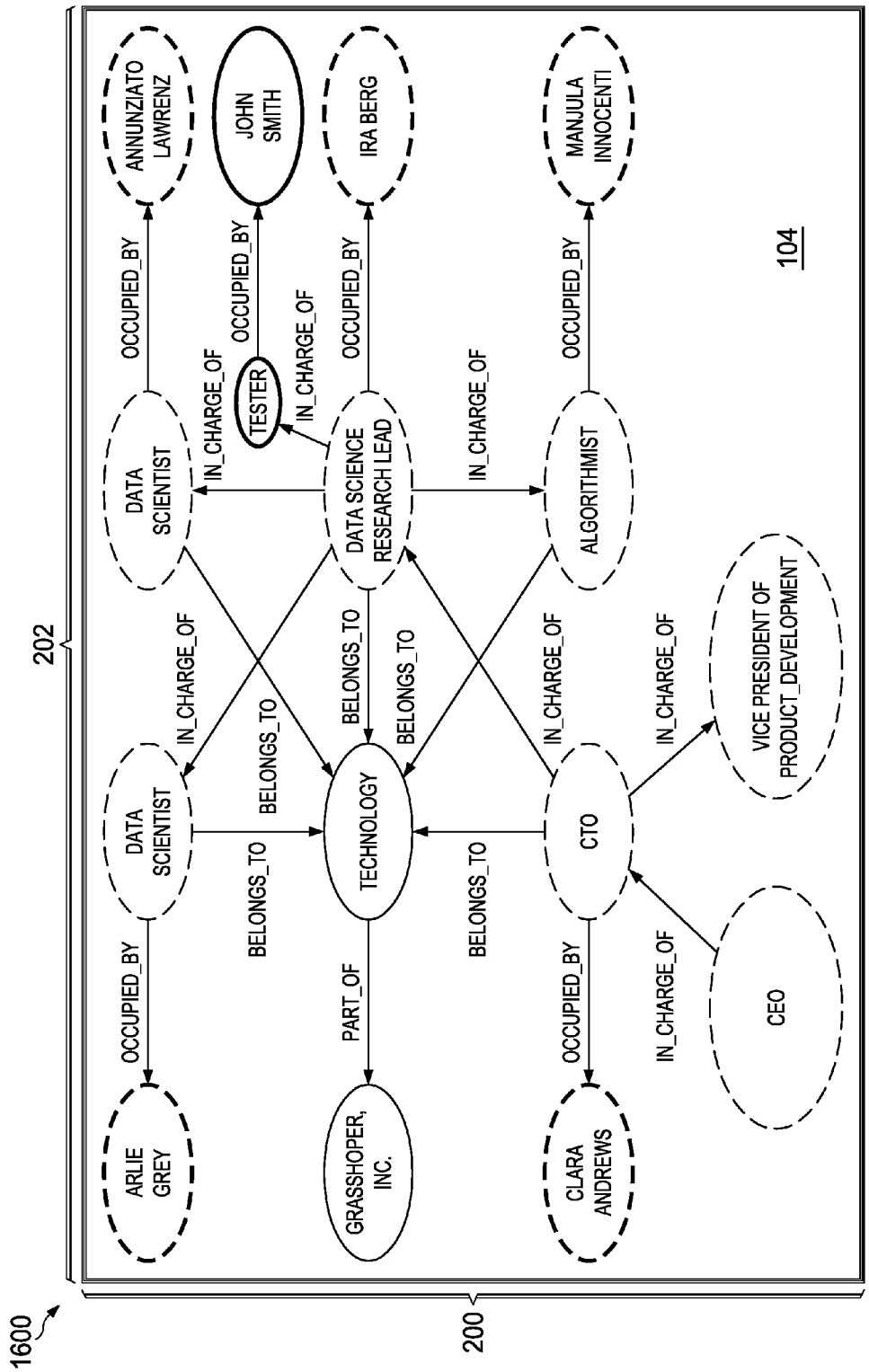
FIG. 16 is an illustration of a model for an organization that includes updates in accordance with an illustrative embodiment.

With reference next to FIG. 16, an illustration of a model for an organization that includes updates is depicted in accordance with an illustrative embodiment. In this illustration, model 1600 shows an example of nodes 200 and relationships 202 in FIG. 2 for organization 104 that may be displayed in client 112 in FIG. 1. In particular, model 1600 shows nodes 200 and relationships 202 after an update has been applied to nodes 200 and relationships 202 in model 1500 in FIG. 15. In this illustrative example, the update to nodes 200 and relationships 202 is the addition of a node in nodes 200 for the position tester; another node in nodes for the employee John Smith; a relationship in relationships 202 indicating that the tester position is occupied by John Smith; and another relationship in relationships 202 that indicates the data science research lead is in charge of the tester position.

Figure 17:
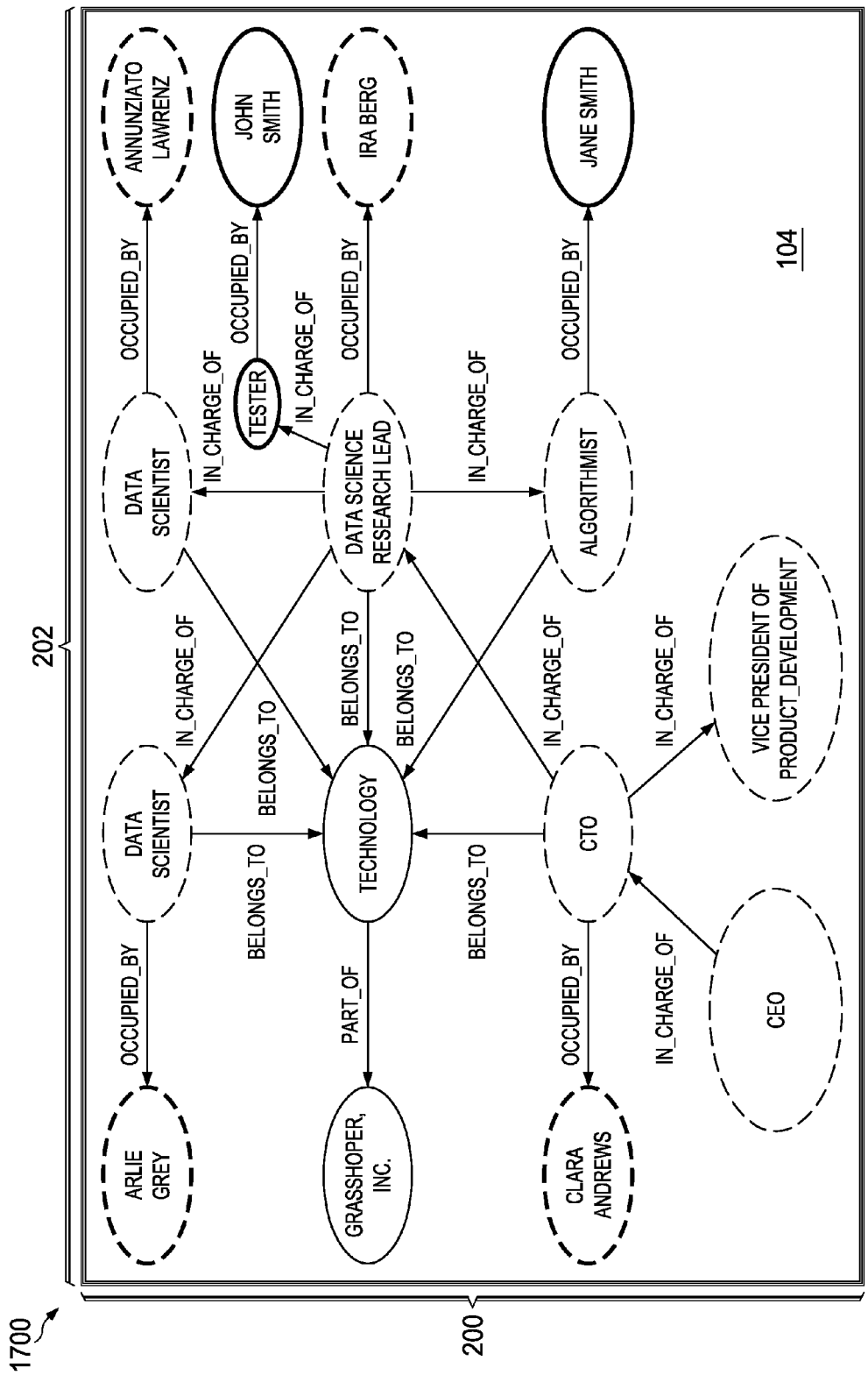
FIG. 17 is an illustration of a model for an organization that includes updates in accordance with an illustrative embodiment.

With reference next to FIG. 17, an illustration of a model for an organization that includes updates is depicted in accordance with an illustrative embodiment. In this illustration, model 1700 shows an example of nodes 200 and relationships 202 in FIG. 2 for organization 104 that may be displayed in client 112 in FIG. 1. In particular, model 1700 shows nodes 200 and relationships 202 after an update has been applied to nodes 200 and relationships 202 in model 1600 in FIG. 16.

In this illustrative example, the update to nodes 200 and relationships 202 is a change to the node in nodes 200 for the employee in organization 104 that occupies the algorithmist position. As depicted, Jane Smith is the employee that occupies the algorithmist position in model 1700.

Figure 18:
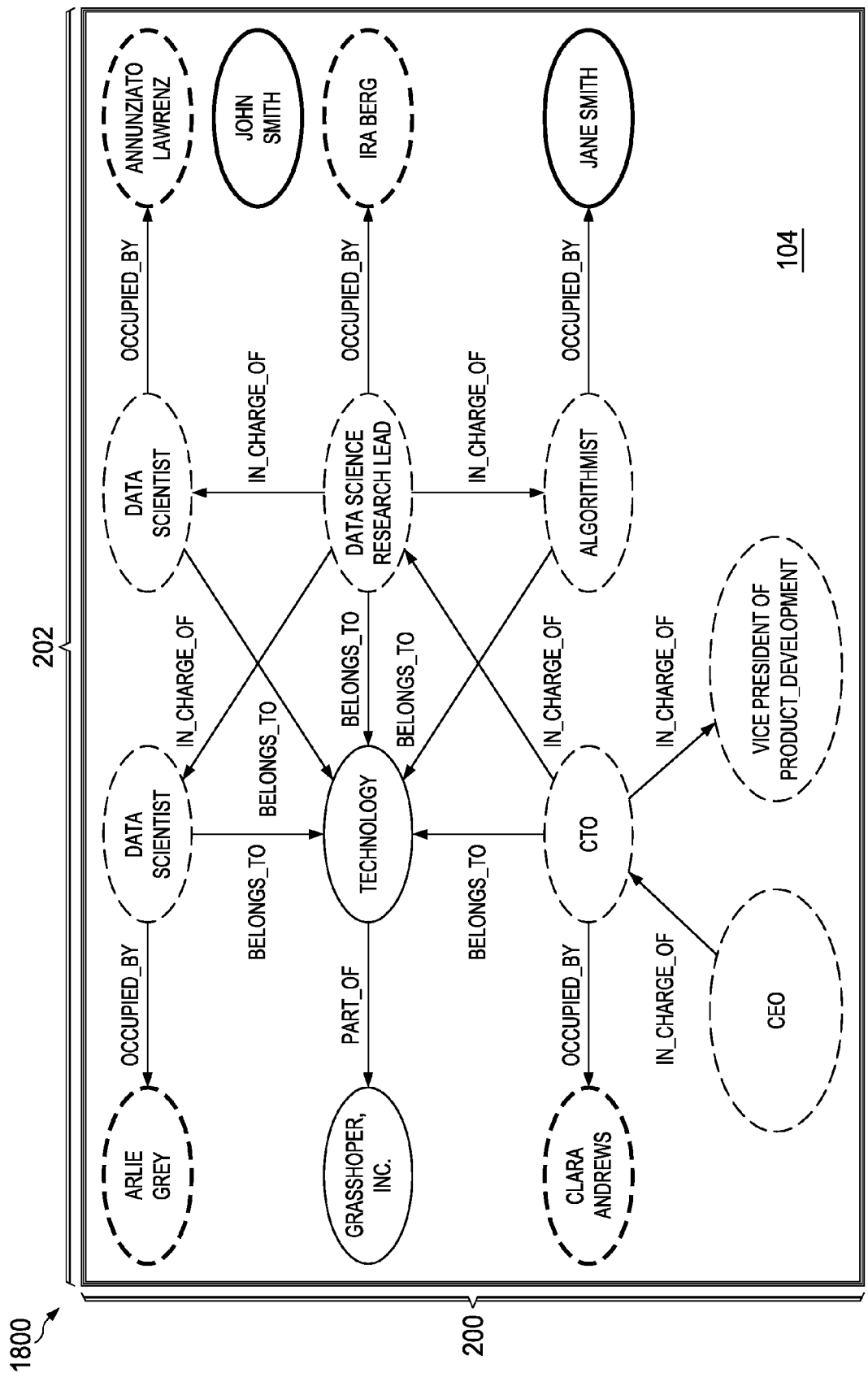
FIG. 18 is an illustration of a model for an organization that includes updates in accordance with an illustrative embodiment.

Turning to FIG. 18, an illustration of a model for an organization that includes updates is depicted in accordance with an illustrative embodiment. In this illustration, model 1800 shows an example of nodes 200 and relationships 202 in FIG. 2 for organization 104 that may be displayed in client 112 in FIG. 1. In particular, model 1800 shows nodes 200 and relationships 202 after an update has been applied to nodes 200 and relationships 202 in model 1700 in FIG. 17.

In this illustrative example, the update to nodes 200 and relationships 202 is the removal of the node in nodes 200 for the tester position. As depicted, with the removal of the tester position, John Smith is no longer assigned to a position by a relationship in relationships 202.

Figure 19:
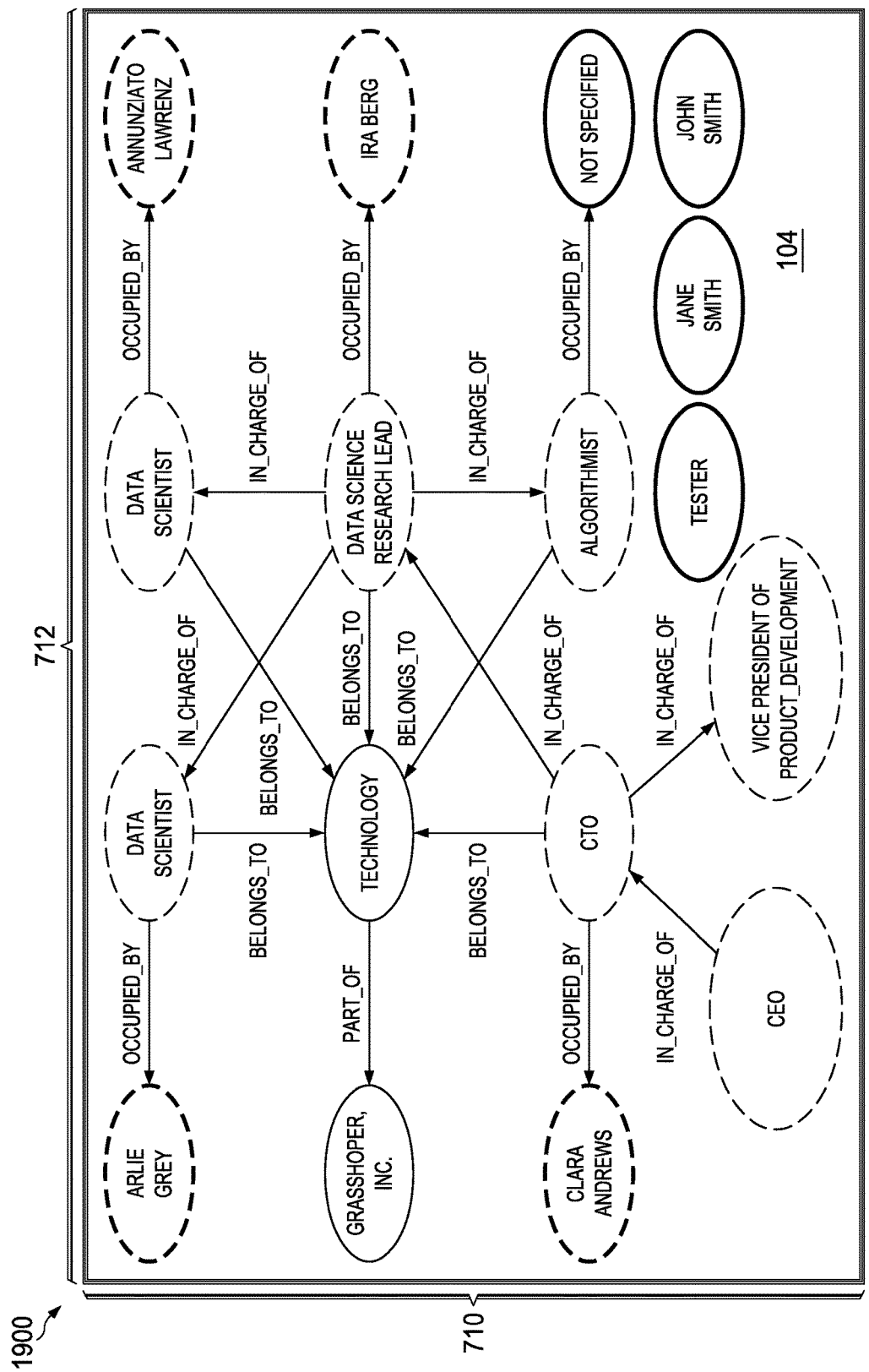
FIG. 19 is an illustration of a model for an organization in accordance with an illustrative embodiment.

Turning to FIG. 19, an illustration of a model for an organization is depicted in accordance with an illustrative embodiment. In this illustration, model 1900 shows an example of nodes 810, relationships 812, and place holders 816 in FIG. 8 for organization 104 that may be displayed in client 112 in FIG. 1.

In particular, model 1900 is an example of information 904 and additional information 918 in FIG. 9 that may be sent to client 112 for display on display system 908 in FIG. 9. As depicted, model 1900 includes a node in nodes 810 for a place holder for a person that occupies the algorithmist position. In this example, the occupied by relationship for algorithmist points to the place holder.

In this illustrative example, nodes 810 also include nodes for the tester position, Jane Smith, and John Smith. In this illustrative example, relationships 812 do not include a relationship pointing to tester, Jane Smith, or John Smith.

Figure 20:
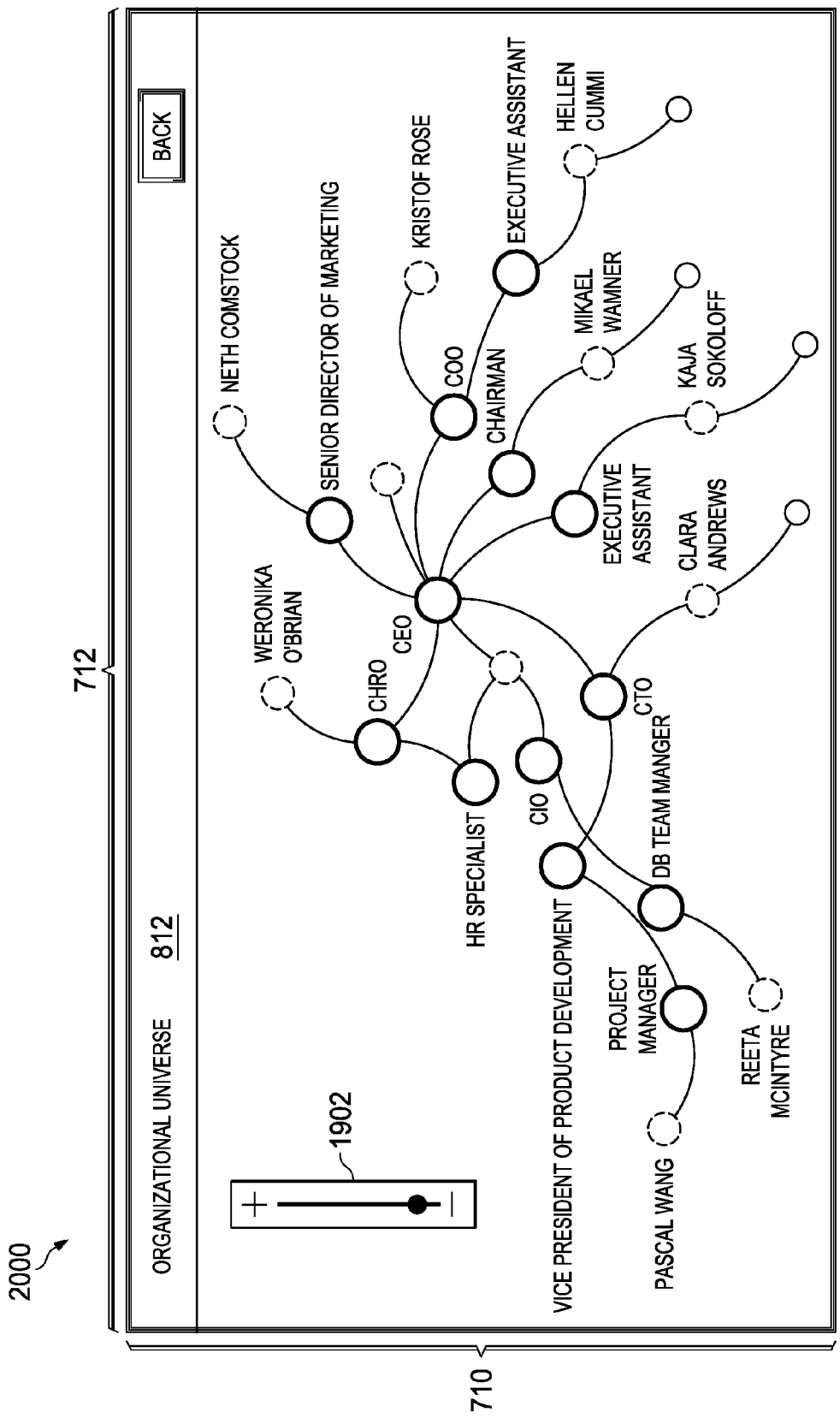
FIG. 20 is an illustration of a graphical user interface for displaying nodes and relationships of an organization in accordance with an illustrative embodiment.

With reference next to FIG. 20, an illustration of a graphical user interface for displaying nodes and relationships of an organization is depicted in accordance with an illustrative embodiment. As depicted, graphical user interface 2000 is an example of window 912 in FIG. 9.

In this illustrative example, an operator provides user input to slider bar 2002 for selecting zoom factor for window 912 in FIG. 9. When a position for slider bar 2002 is selected, a size of window 912 is based on the zoom factor selected. In other words, when the user uses slider bar 2002 to zoom in, more nodes in nodes 810 and more relationships in relationships 812 can be displayed in window 912. As depicted, the display of nodes 810 and relationships 812 of the organization in window 912 enables a desired level of comprehension of the model of the organization.

Figure 21:
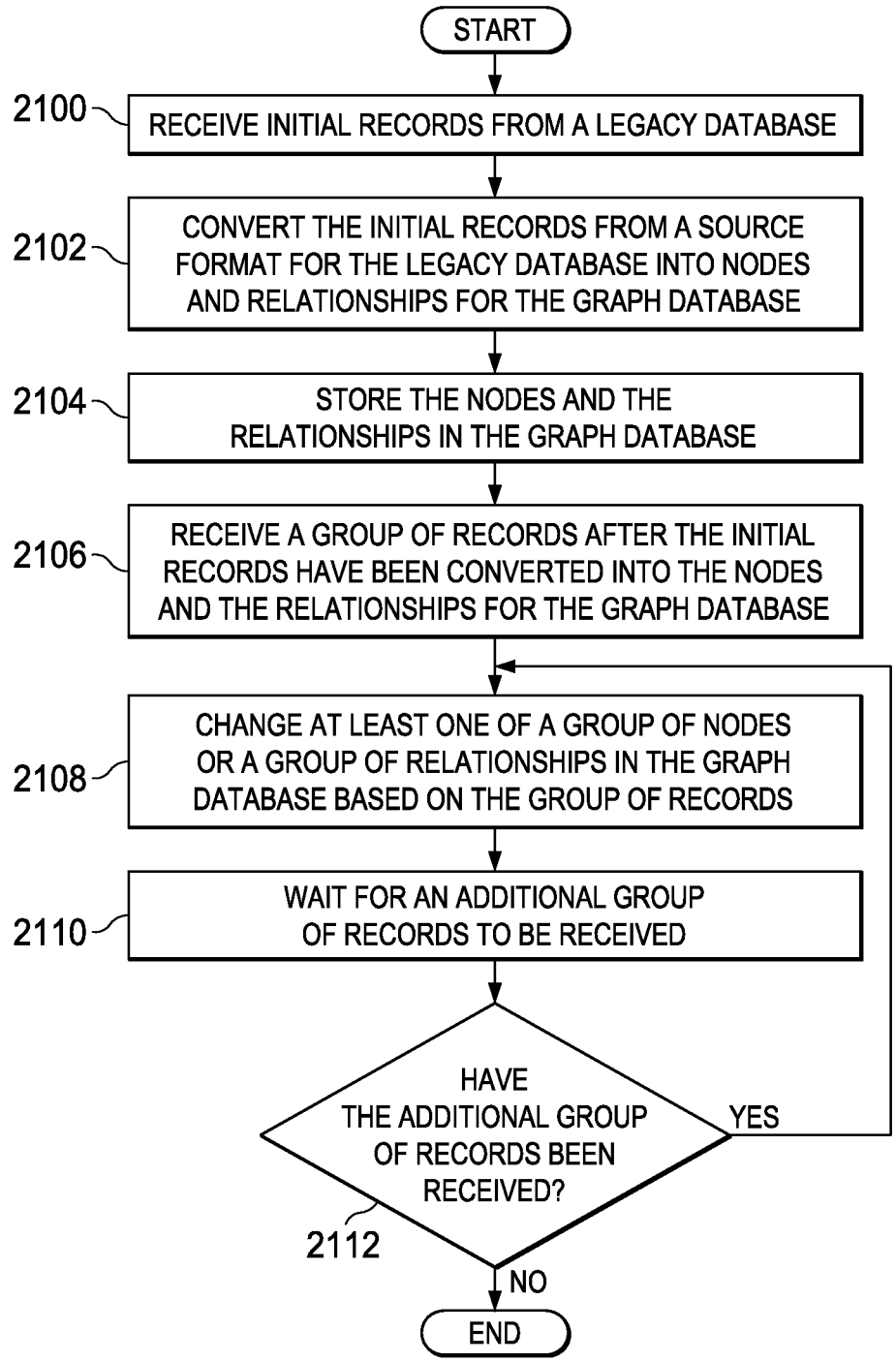
FIG. 21 is an illustration of a flowchart of a process for adding information to a graph database in accordance with an illustrative embodiment.

With reference now to FIG. 21, an illustration of a flowchart of a process for adding information to a graph database is depicted in accordance with an illustrative embodiment. The process illustrated in FIG. 21, may be implemented in organization information environment 100 in FIG. 1. In particular, the process may be implemented in graph loader 118 in flexible graph system 114.

The process begins by receiving initial records from a legacy database (operation 2100). The process then converts the initial records from a source format for the legacy database into nodes and relationships for the graph database (operation 2102). The process then stores the nodes and the relationships in the graph database (operation 2104).

The process also receives a group of records after the initial records have been converted into the nodes and the relationships for the graph database (operation 2106). In this illustrative example, the group of records is one or more additional records from the legacy database. In this illustrative example, the organization may continue to use the legacy database. Changes to the legacy database are received in the process in operation 2106.

The process changes at least one of a group of nodes or a group of relationships in the graph database based on the group of records (operation 2108). The process then waits for an additional group of records to be received (operation 2110).

The process next determines whether the additional group of records has been received (operation 2112). When additional group of records is received, the process then returns to operation 2108. In this manner, the synchronization occurs between the legacy database and the graph database. In the illustrative example, the updating of the graph database may occur as quickly as possible. The speed at which the updates occur to synchronize the databases may occur in what is considered to be real-time. With reference again to operation 2112, when no additional groups of records are received the process terminates thereafter.

Figure 22:
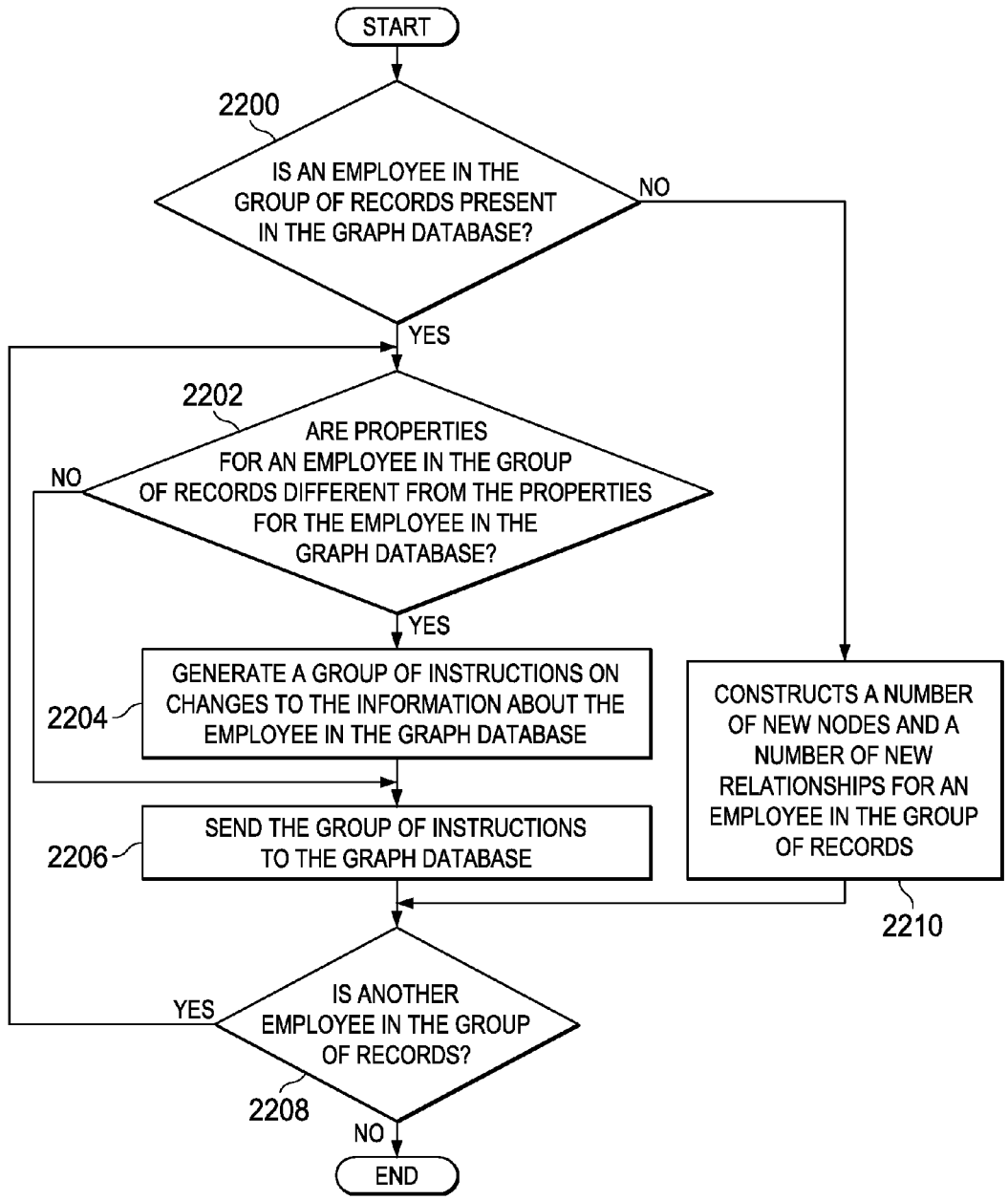
FIG. 22 is an illustration of a flowchart of a process for changing at least one of a group of nodes or a group of relationships in a graph database in accordance with an illustrative embodiment.

Turning next to FIG. 22, an illustration of a flowchart of a process for changing at least one of a group of nodes or a group of relationships in a graph database is depicted in accordance with an illustrative embodiment. The process illustrated FIG. 22 is an example of one implementation for operation 2108 in FIG. 21. In this illustrated example, the operations may be implemented in drip loader 802 in graph loader 118 in FIG. 8. This process may perform at least one of adding a node, deleting the node, modifying the node, adding a relationship, deleting the relationship, or modifying the relationship.

The process begins by determining whether an employee in the group of records is present in the graph database (operation 2200). If the employee is present, the process determines whether properties for an employee in the group of records are different from the properties for the employee in the graph database (operation 2202). The process generates a group of instructions on changes to the information about the employee in the graph database when the properties in the records are different from the properties in the graph database (operation 2204). With reference again to operation 2202, the process continues to operation 2206 without generating the group of instructions when the properties in the records are not different than the properties in the graph database. The process then sends the group of instructions to the graph database (operation 2206). The process then determines whether another employee is in the group of records (operation 2208).

If another employee is present, the process returns to operation 2202 for the other employee. Otherwise, the process terminates thereafter.

With reference again to operation 2200, if the employee is not present, the process constructs a number of new nodes and a number of new relationships for an employee in the group of records (operation 2210). The process then proceeds to operation 2208 as described above.

Figure 23:
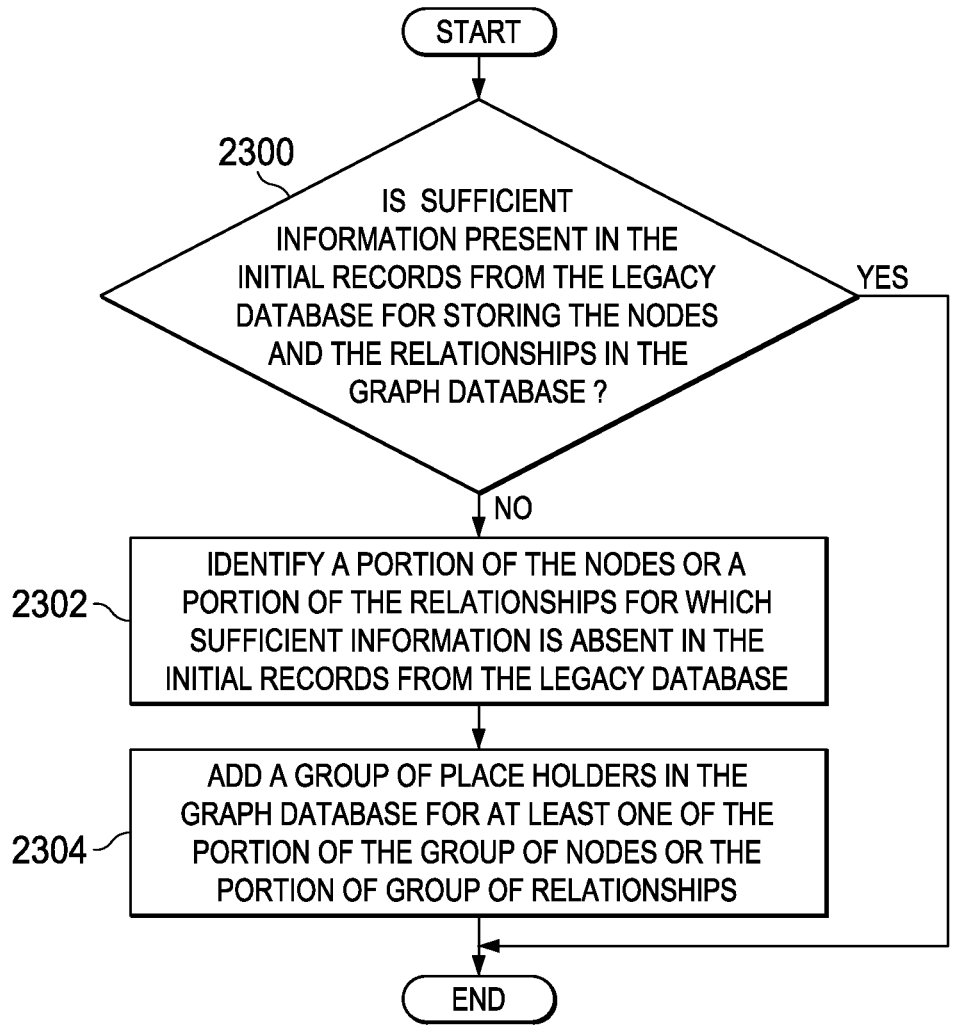
FIG. 23 is an illustration of a flowchart of a process for processing initial records in accordance with an illustrative embodiment.

Turning next to FIG. 23, an illustration of a flowchart of a process for processing initial records is depicted in accordance with an illustrative embodiment. This process may be used when information needed to generate nodes and relationships in the graph database is missing in information received from the legacy database. This process may be implemented in place holder generator 804 in graph loader 118 in FIG. 8.

The process begins by determining whether sufficient information is present in the initial records from the legacy database for storing the nodes and the relationships in the graph database (operation 2300). When sufficient information is absent, the process identifies a portion of the nodes or a portion of the relationships for which sufficient information is absent in the initial records from the legacy database (operation 2302). The process then adds a group of place holders in the graph database for at least one of the portion of the group of nodes or the portion of group of relationships (operation 2304), with the process terminating thereafter.

With reference again to operation 2300, if sufficient information is present in the initial records, the process terminates. In this case, place holders are not needed and the graph database is complete using the information from the legacy database.

In these illustrative examples, the place holders may be temporary. Place holders are removed when information is entered into the graph database by a user. In other illustrative examples, place holders may be replaced with information being present for at least one of the nodes or relationships for which insufficient information is present in the group of records. In particular, drip loaders may replace the group of place holders when information is present in the group of records for replacing the group of place holders.

Figure 24:
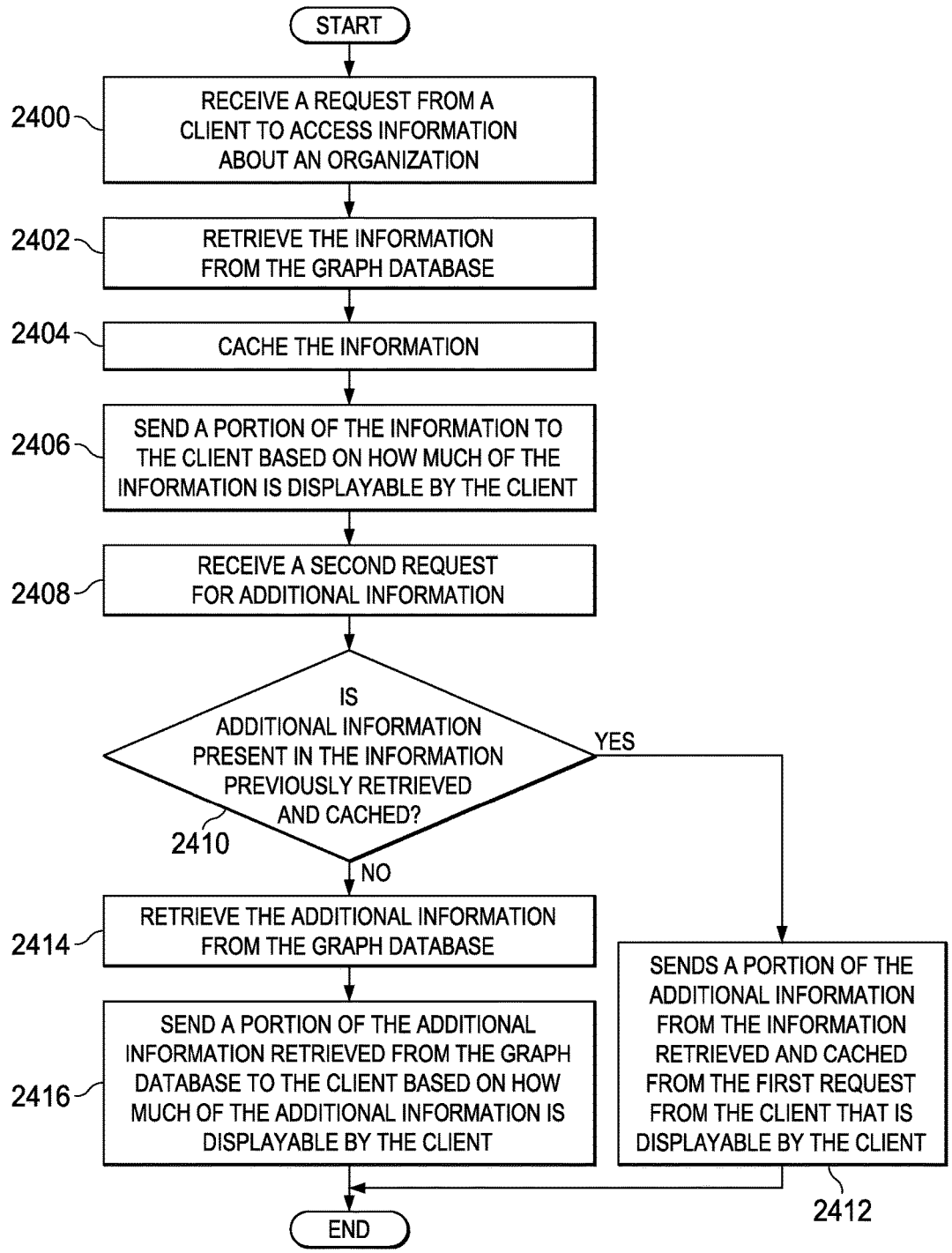
FIG. 24 is an illustration of a flowchart of a process for retrieving information from a graph database in accordance with an illustrative embodiment.

With reference now to FIG. 24, an illustration of a flowchart of a process for retrieving information from a graph database is depicted in accordance with an illustrative embodiment. The process illustrated in FIG. 24 may be implemented in organization information environment 100 in FIG. 1. In particular, the process may be implemented in interface 122 in flexible graph system 114 in FIG. 1.

The process begins by receiving a request from a client to access information about an organization (operation 2400). The process then retrieves the information from the graph database (operation 2402). The process caches the information (operation 2404). The process then sends a portion of the information to the client based on how much of the information is displayable by the client (operation 2406).

The process then receives a second request for additional information (operation 2408). The process determines whether the additional information is present in the information previously retrieved and cached (operation 2410). If the additional information is located in the information previously retrieved and cached, the process sends a portion of the additional information from the information retrieved and cached from the first request from the client that is displayable by the client (operation 2412), with the process terminating thereafter.

With reference again to operation 2410, when the additional information is absent from the information retrieved and cached, the process retrieves the additional information from the graph database (operation 2414). The process sends a portion of the additional information retrieved from the graph database to the client based on how much of the additional information is displayable by the client (operation 2416), with the process terminating thereafter.

Figure 25:
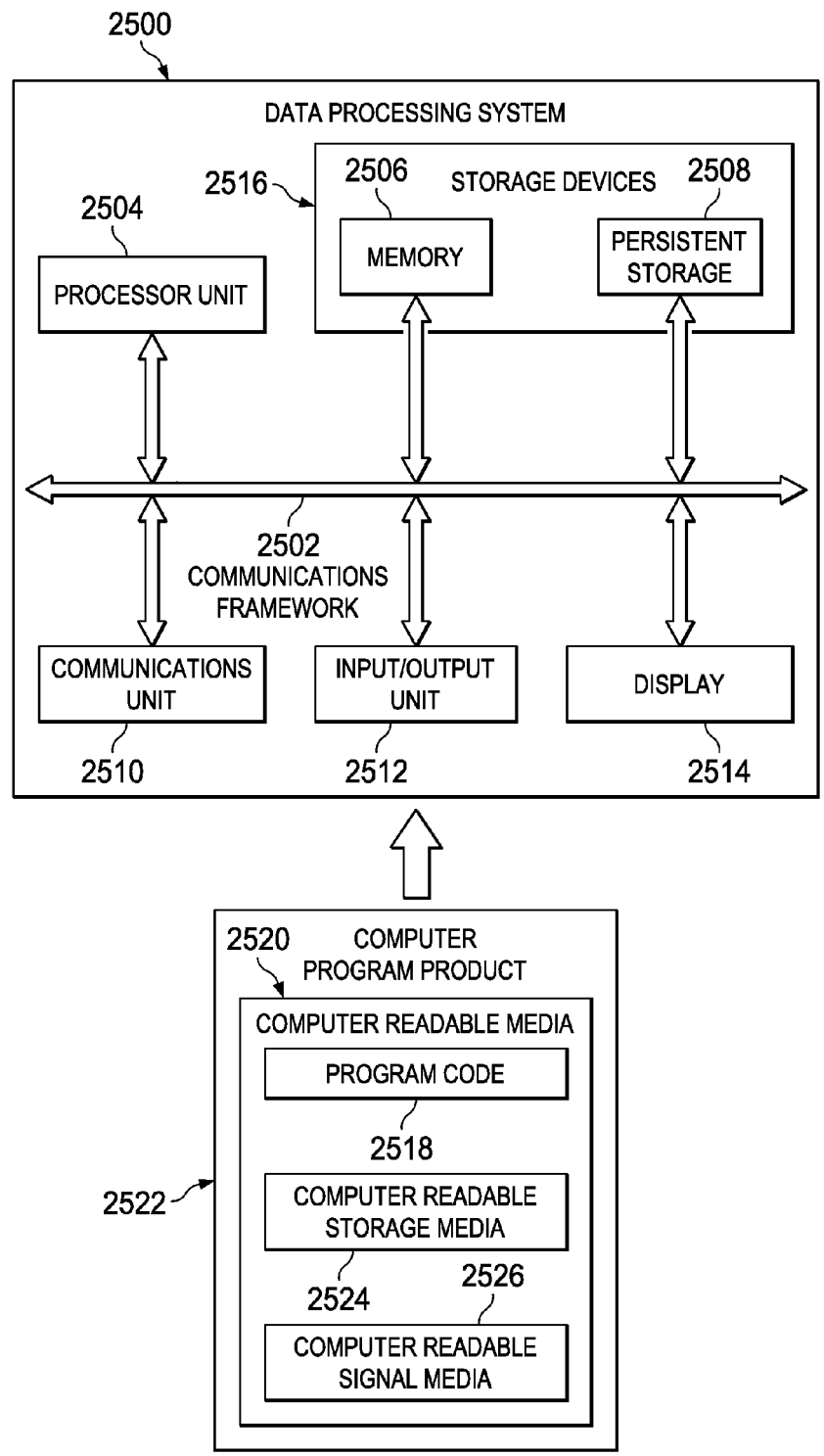
FIG. 25 is an illustration of a block diagram of a data processing system in accordance with an illustrative embodiment.

Turning now to FIG. 25, an illustration of a block diagram of a data processing system is depicted in accordance with an illustrative embodiment. Data processing system 2500 may be used to implement client 112 and computer system 116 in FIG. 1. In this illustrative example, data processing system 2500 includes communications framework 2502, which provides communications between processor unit 2504, memory 2506, persistent storage 2508, communications unit 2510, input/output (I/O) unit 2512, and display 2514. In this example, communications framework 2502 may take the form of a bus system.

Processor unit 2504 serves to execute instructions for software that may be loaded into memory 2506. Processor unit 2504 may be a number of processors, a multi-processor core, or some other type of processor, depending on the particular implementation.

Memory 2506 and persistent storage 2508 are examples of storage devices 2516. A storage device is any piece of hardware that is capable of storing information, such as, for example, without limitation, at least one of data, program code in functional form, or other suitable information either on a temporary basis, a permanent basis, or both on a temporary basis and a permanent basis. Storage devices 2516 may also be referred to as computer readable storage devices in these illustrative examples. Memory 2506, in these examples, may be, for example, a random access memory (RAM) or any other suitable volatile or non-volatile storage device. Persistent storage 2508 may take various forms, depending on the particular implementation.

For example, persistent storage 2508 may contain one or more components or devices. For example, persistent storage 2508 may be a hard drive, a flash memory, a rewritable optical disk, a rewritable magnetic tape, or some combination of the above. The media used by persistent storage 2508 also may be removable. For example, a removable hard drive may be used for persistent storage 2508.

Communications unit 2510, in these illustrative examples, provides for communications with other data processing systems or devices. In these illustrative examples, communications unit 2510 is a network interface card.

Input/output unit 2512 allows for input and output of data with other devices that may be connected to data processing system 2500. For example, input/output unit 2512 may provide a connection for user input through at least one of a keyboard, a mouse, or some other suitable input device. Further, input/output unit 2512 may send output to a printer. Display 2514 provides a mechanism to display information to a user.

Instructions for at least one of the operating system, applications, or programs may be located in storage devices 2516, which are in communication with processor unit 2504 through communications framework 2502. The processes of the different embodiments may be performed by processor unit 2504 using computer-implemented instructions, which may be located in a memory, such as memory 2506.

These instructions are referred to as program code, computer usable program code, or computer readable program code that may be read and executed by a processor in processor unit 2504. The program code in the different embodiments may be embodied on different physical or computer readable storage media, such as memory 2506 or persistent storage 2508.

Program code 2518 is located in a functional form on computer readable media 2520 that is selectively removable and may be loaded onto or transferred to data processing system 2500 for execution by processor unit 2504. Program code 2518 and computer readable media 2520 form computer program product 2522 in these illustrative examples. In one example, computer readable media 2520 may be computer readable storage media 2524 or computer readable signal media 2526.

In these illustrative examples, computer readable storage media 2524 is a physical or tangible storage device used to store program code 2518 rather than a medium that propagates or transmits program code 2518. Alternatively, program code 2518 may be transferred to data processing system 2500 using computer readable signal media 2526. Computer readable signal media 2526 may be, for example, a propagated data signal containing program code 2518. For example, computer readable signal media 2526 may be at least one of an electromagnetic signal, an optical signal, or any other suitable type of signal. These signals may be transmitted over at least one of communications links, such as wireless communications links, optical fiber cables, coaxial cables, a wire, or any other suitable type of communications link.

The different components illustrated for data processing system 2500 are not meant to provide architectural limitations to the manner in which different embodiments may be implemented. The different illustrative embodiments may be implemented in a data processing system including components in addition to or in place of those illustrated for data processing system 2500. Other components shown in FIG. 25 can be varied from the illustrative examples shown. The different embodiments may be implemented using any hardware device or system capable of running program code 2518.

The description of the different illustrative embodiments has been presented for purposes of illustration and description, and is not intended to be exhaustive or limited to the embodiments in the form disclosed. The different illustrative examples describe components that perform actions or operations. In an illustrative embodiment, a component may be configured to perform the action or operation described. For example, the component may have a configuration or design for a structure that provides the component an ability to perform the action or operation that is described in the illustrative examples as being performed by the component.

Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A computer system comprising:
   a hardware processor;
   a graph database, in communication with the hardware processor, having nodes and relationships describing an organization;
   an interface, in communication with the hardware processor, that receives a request from a client to access information about the organization; retrieves the information from the graph database when the information is not located in a cache; and sends a portion of the information to the client based on how much of the information is displayable by the client; and
   a cache manager, in communication with the hardware processor, that receives a notification that the client has accessed the interface; retrieves the portion of the information from the graph database based on prior requests for information received from at least one of the client or other clients; and stores the portion of the information in the cache.

2. The computer system of claim 1, wherein the request is a first request and the interface receives a second request from the client for additional information, wherein the interface caches the information retrieved from the graph database and sends the additional information from information retrieved and cached from the first request from the client when the additional information is located in the information; retrieves the additional information from the graph database when the additional information is absent from the information retrieved and cached; and sends a portion of the additional information to the client based on how much of the additional information is displayable by the client.

3. The computer system of claim 1, wherein the portion of the information is selected from one of all of the information retrieved from the graph database or part of the information retrieved from the graph database.

4. The computer system of claim 1, wherein the interface identifies how much of the information is displayable by the client.

5. The computer system of claim 1, wherein the nodes comprise employees in the organization, departments in the organization, and positions for the employees, and wherein the relationships comprise a group of relationships between the employees and the positions and between the positions and the departments.

6. The computer system of claim 1, wherein at least one of the interface or the graph database determines whether the client has permission to access the portion of the information from the graph database prior to sending the portion of the information to the client.

7. The computer system of claim 6, wherein in determining whether the client has the permission to access the portion of the information from the graph database, at least one of the interface or the graph database looks up permissions for the client in a table of permissions for clients.

8. The computer system of claim 1, wherein the notification that the client has accessed the interface comprises a client identifier, the cache manager retrieves a profile for portions of the information that match the client identifier, and the cache manager identifies the portion based on the profile.

9. A method for accessing a graph database having nodes and relationships describing an organization; the method comprising:
  receiving, by an interface in a computer system, a request from a client to access information about the organization;
  retrieving, by the interface in the computer system, the information from the graph database when the information is not located in a cache, the graph database having the nodes and the relationships describing the organization;
  sending, by the interface in the computer system, a portion of the information to the client based on how much of the information is displayable by the client;
  receiving, by a cache manager in the computer system, a notification that the client has accessed the interface;
  retrieving, by the cache manager in the computer system, the portion of the information from the graph database based on prior requests for information received from at least one of the client or other clients; and
  storing, by the cache manager in the computer system, the portion of the information in the cache.

10. The method of claim 9, wherein the request is a first request and the interface receives a second request from the client for additional information and further comprising:
  caching, by the interface in the computer system, the information retrieved from the graph database;
  sending, by the interface in the computer system, a portion of the additional information from the information retrieved and cached from the first request from the client when the additional information is located in the information wherein the portion of the additional information is based on how much of the additional information is displayable by the client; and
  retrieving, by the interface in the computer system, the additional information from the graph database when the additional information is absent from the information retrieved and cached; and
  sending, by the interface in the computer system, the portion of the additional information retrieved from the graph database to the client based on how much of the additional information is displayable by the client.

11. The method of claim 9, wherein the portion of the information is selected from one of all of the information retrieved from the graph database or part of the information retrieved from the graph database.

12. The method of claim 9, wherein the interface identifies how much of the information is displayable by the client.

13. The method of claim 9, wherein the nodes comprise employees in the organization, departments in the organization, and positions for the employees, and wherein the relationships comprise a group of relationships between the employees and the positions and between the positions and the departments.

14. The method of claim 9, wherein at least one of the interface or the graph database determines whether the client has permission to access the portion of the information from the graph database prior to sending the portion of the information to the client.

15. A computer program product for displaying information about an organization on a display system, the computer program product comprising:
  a computer readable storage media;
  first program code, stored on the computer readable storage media, for receiving a request from a client to access the information about the organization;
  second program code, stored on the computer readable storage media, for retrieving the information from a graph database when the information is not located in a cache, the graph database having nodes and relationships describing the organization;
  third program code, stored on the computer readable storage media, for sending a portion of the information to the client based on how much of the information is displayable by the client;
  fourth program code, stored on the computer readable storage media, for receiving a notification that the client has accessed the interface;
  fifth program code, stored on the computer readable storage media, for retrieving the portion of the information from the graph database based on prior requests for information received from at least one of the client or other clients; and
  sixth program code, stored on the computer readable storage media, for storing the portion of the information in the cache.

16. The computer program product of claim 15, wherein the request is a first request and an interface receives a second request from the client for additional information and further comprising:
  seventh program code, stored on the computer readable storage media, for caching the information retrieved from the graph database;
  eighth program code, stored on the computer readable storage media, for sending a portion of the additional information from the information retrieved and cached from the first request from the client when the additional information is located in the information wherein the portion of the additional information is based on how much of the additional information is displayable by the client;

ninth program code, stored on the computer readable storage media, for retrieving the additional information from the graph database when the additional information is absent from the information retrieved and cached; and tenth program code, stored on the computer readable storage media, for sending the portion of the additional information retrieved from the graph database to the client based on how much of the additional information is displayable by the client.

17. The computer program product of claim 15, wherein the portion of the information is selected from one of all of the information retrieved from the graph database or part of the information retrieved from the graph database.

18. The computer program product of claim 15, wherein an interface identifies how much of the information is displayable by the client.

* * * * *